(12) United States Patent
Sasaki et al.

(10) Patent No.: US 6,882,503 B2
(45) Date of Patent: Apr. 19, 2005

(54) THIN-FILM MAGNETIC HEAD AND METHOD OF MANUFACTURING SAME, AND SLIDER OF THIN-FILM MAGNETIC HEAD AND METHOD OF MANUFACTURING SAME

(75) Inventors: Yoshitaka Sasaki, Milpitas, CA (US); Takehiro Kamigama, Hong Kong (CN)

(73) Assignees: Headway Technologies, Inc., Milpitas, CA (US); Sae Magnetics (H.K.) Ltd., Hong Kong (CN)

( * ) Notice: Subject to any disclaimer, the term of this patent is extended or adjusted under 35 U.S.C. 154(b) by 194 days.

(21) Appl. No.: 10/057,946

(22) Filed: Jan. 29, 2002

(65) Prior Publication Data

US 2003/0140481 A1 Jul. 31, 2003

(51) Int. Cl.[7] .......................... G11B 21/21; G11B 5/60; G11B 5/127
(52) U.S. Cl. .................................. 360/234.7; 360/126
(58) Field of Search ............................... 360/125, 126, 360/317, 234.7, 234.8, 234.9, 234.6, 234.5

(56) References Cited

U.S. PATENT DOCUMENTS

| | | | | |
|---|---|---|---|---|
| 4,219,853 A | * | 8/1980 | Albert et al. ............. | 360/234.5 |
| 4,992,897 A | * | 2/1991 | Deroux-Dauphin ...... | 360/234.7 |
| 5,020,213 A | * | 6/1991 | Aronoff et al. .......... | 29/603.12 |
| 5,555,145 A | * | 9/1996 | Kajitani .................... | 360/234.7 |
| 5,566,038 A | * | 10/1996 | Keel et al. ................ | 360/234.5 |
| 5,610,783 A | * | 3/1997 | Maffitt et al. ............. | 360/234.5 |
| 5,774,975 A | * | 7/1998 | Maffitt et al. ............. | 29/603.12 |
| 5,822,153 A | * | 10/1998 | Lairson et al. ........... | 360/234.7 |
| 5,914,834 A | * | 6/1999 | Gustafson ................ | 360/234.5 |
| 6,731,464 B1 | * | 5/2004 | Sasaki et al. ............. | 360/236.3 |

FOREIGN PATENT DOCUMENTS

| | | |
|---|---|---|
| JP | A 9-63027 | 3/1997 |
| JP | A 11-185418 | 7/1999 |
| JP | A 2000-3570 | 1/2000 |
| JP | A 2000-215429 | 8/2000 |

\* cited by examiner

*Primary Examiner*—William J. Klimowicz
(74) *Attorney, Agent, or Firm*—Oliff & Berridge, PLC

(57) ABSTRACT

A slider comprises a slider section and a reproducing head section. The slider section has a first medium facing surface, an air inflow end, and a recording head. The reproducing head section has a second medium facing surface, an air outflow end, and a reproducing head. The slider section and the reproducing head section are fabricated separately, and bonded to each other so that the first medium facing surface and the second medium facing surface are continuous.

13 Claims, 26 Drawing Sheets

THIN-FILM MAGNETIC HEAD AND METHOD OF MANUFACTURING SAME, AND SLIDER OF THIN-FILM MAGNETIC HEAD AND METHOD OF MANUFACTURING SAME

BACKGROUND OF THE INVENTION

1. Field of the Invention

The present invention relates to a thin-film magnetic head having both a recording head and a reproducing head and a method of manufacturing the same, and a slider for a thin-film magnetic head having both a recording head and a reproducing head and a method of manufacturing the same.

2. Description of the Related Art

Performance improvements in thin-film magnetic heads have been sought as areal recording density of hard disk drives has increased. Such thin-film magnetic heads include composite thin-film magnetic heads that have been widely used. A composite head is made of a layered structure including a recording head having an induction-type electromagnetic transducer for writing and a reproducing head having a magnetoresistive element (that may be hereinafter called an MR element) for reading. MR elements include an anisotropic magnetoresistive (AMR) element that utilizes the AMR effect and a giant magnetoresistive (GMR) element that utilizes the GMR effect. A reproducing head using an AMR element is called an AMR head or simply an MR head. A reproducing head using a GMR element is called a GMR head. An AMR head is used as a reproducing head where areal recording density is more than 1 gigabit per square inch. A GMR head is used as a reproducing head where areal recording density is more than 3 gigabits per square inch. It is GMR heads that have been most widely used recently.

Performance of the reproducing head is improved by replacing the AMR film with a GMR film and the like having an excellent magnetoresistive sensitivity. Alternatively, a pattern width such as the reproducing track width and the MR height, in particular, may be optimized. The MR height is the length (height) between an end of the MR element located in the air bearing surface and the other end. The air bearing surface is a surface of the thin-film magnetic head facing toward a magnetic recording medium.

Performance improvements in a recording head are also required as the performance of a reproducing head is improved. It is required to increase the recording track density in order to increase the areal recording density among the performance characteristics of the recording head. To achieve this, it is required to implement a recording head of a narrow track structure wherein the width of top and bottom poles sandwiching the recording gap layer on a side of the air bearing surface is reduced down to microns or a submicron order. Semiconductor process techniques are utilized to implement such a structure. A pattern width, such as the throat height in particular, is also a factor that determines the recording head performance. The throat height is the length (height) of pole portions, that is, portions of magnetic pole layers facing each other with a recording gap layer in between, between the air-bearing-surface-side end and the other end. To achieve improvement in the recording head performance, it is desirable to reduce the throat height. The throat height is controlled by an amount of lapping when the air bearing surface is processed.

As thus described, it is important to fabricate well-balanced recording and reproducing heads to improve the performance of the thin-film magnetic head.

In order to implement a thin-film magnetic head that achieves high recording density, the requirements for the reproducing head include a reduction in reproducing track width, an increase in reproducing output, and a reduction in noise. The requirements for the recording head include a reduction in recording track width, an improvement in overwrite property that is a parameter indicating one of characteristics when data is written over existing data, and an improvement in nonlinear transition shift.

In general, a flying-type thin-film magnetic head used in a hard disk drive and the like is made up of a slider having a thin-film magnetic head element formed at the trailing edge thereof. The slider slightly flies over a recording medium by means of airflow generated by the rotation of the medium.

Reference is now made to FIGS. 34 to 36 to describe an example of a method of manufacturing a related-art thin-film magnetic head element. FIG. 34 shows a cross section of the related-art thin-film magnetic head element orthogonal to the air bearing surface. FIG. 35 shows a cross section of the related-art thin-film magnetic head element parallel to the air bearing surface. FIG. 36 is a top view of the related-art thin-film magnetic head element.

According to the manufacturing method, an insulating layer 102 made of alumina ($Al_2O_3$), for example, is first formed on a substrate 101 made of aluminum oxide and titanium carbide ($Al_2O_3$—TiC), for example. On the insulating layer 102, a bottom shield layer 103 of a magnetic material is formed for a reproducing head. Next, a bottom shield gap film 104 of an insulating material such as alumina is formed on the bottom shield layer 103. An MR element 105 for reproduction is then formed on the bottom shield gap film 104. On the bottom shield gap film 104, a pair of electrode layers 106 are formed to be electrically connected to the MR element 105. Next, a top shield gap film 107 of an insulating material such as alumina is formed on the bottom shield gap film 104, the MR element 105 and the electrode layers 106. The MR element 105 is embedded in the shield gap films 104 and 107.

Next, a top-shield-layer-cum-bottom-pole layer (called a bottom pole layer in the following description) 108 is formed on the top shield gap film 107. The bottom pole layer 108 is made of a magnetic material and used for both the reproducing head and the recording head. A recording gap layer 109 of an insulating film such as an alumina film is then formed on the bottom pole layer 108. Next, the recording gap layer 109 is partially etched to form a contact hole for making a magnetic path. A top pole tip 110 of a magnetic material is then formed for the recording head on the recording gap layer 109 in the pole portion. At the same time, a magnetic layer 119 of a magnetic material is formed for making the magnetic path in the contact hole for making the magnetic path.

Next, the recording gap layer 109 and the bottom pole layer 108 are etched through ion milling, using the top pole tip 110 as a mask. As shown in FIG. 35, the structure is called a trim structure wherein the sidewalls of the top pole portion (the top pole tip 110), the recording gap layer 109, and a part of the bottom pole layer 108 are formed vertically in a self-aligned manner. Next, an insulating layer 111 made of an alumina film, for example, is formed over the entire surface. The insulating layer 111 is then lapped to the surfaces of the top pole tip 110 and the magnetic layer 119 and flattened.

On the flattened insulating layer 111, a first layer 112 of a thin-film coil, made of copper (Cu), for example, is formed for the induction-type recording head. Next, a photoresist layer 113 is formed into a specific shape on the insulating layer 111 and the first layer 112 of the coil. Heat treatment is performed at a specific temperature to flatten the surface of the photoresist layer 113. Next, a second layer 114 of the thin-film coil is formed on the photoresist layer 113. A photoresist layer 115 is then formed into a specific shape on the photoresist layer 113 and the second layer 114 of the coil. Heat treatment is performed at a specific temperature to flatten the surface of the photoresist layer 115.

Next, a top pole layer 116 for the recording head is formed on the top pole tip 110, the photoresist layers 113 and 115 and the magnetic layer 119. The top pole layer 116 is made of a magnetic material such as Permalloy (NiFe). Next, an overcoat layer 117 of alumina, for example, is formed to cover the top pole layer 116. Finally, machine processing of the slider including the forgoing layers is performed to form the air bearing surface 118 of the recording head and the reproducing head. The thin-film magnetic head element is thus completed.

In FIG. 36, the overcoat layer 117 and the other insulating layers and films are not shown.

Reference is now made to FIGS. 37 to 42 to describe the configuration and functions of a related-art slider. FIG. 37 is a bottom view showing an example of a configuration of the air bearing surface of the related-art slider. FIG. 38 is a perspective view of the related-art slider. In the example shown in FIGS. 37 and 38, the air bearing surface of the slider 120 is shaped such that the slider 120 slightly flies over the surface of a recording medium such as a magnetic disk by means of an airflow generated by the rotation of the recording medium. In this example, a thin-film magnetic head element 122 is disposed at a position near the air outflow end of the slider 120 (the end on the upper side of FIG. 37) and near the air bearing surface thereof. The configuration of the thin-film magnetic head element 122 is as shown in FIGS. 34 to 36, for example. Portion A of FIG. 37 corresponds to FIG. 35.

In the example shown in FIGS. 37 and 38, the air bearing surface of the slider 120 has first surfaces 121a that are closest to the recording medium, a second surface 121b having a first difference in level from the first surfaces 121a, and a third surface 121c having a second difference in level, greater than the first difference in level, from the first surfaces 121a. The first surfaces 121a are provided close to both sides along the width of the slider 120 (the lateral direction in FIG. 37) and around the thin-film magnetic head element 122. The second surface 121b is provided close to the air inflow end (the end on the lower side of FIG. 37). The remaining part of the air bearing surface, i.e., the part other than the first and second surfaces 121a and 121b, constitutes the third surface 121c. The first difference in level between the first and second surfaces 121a and 121b is about 1 µm. The second difference in level between the first and third surfaces 121a and 121c is about 2 to 3 µm.

While the recording medium is rotating, a pressure is created between the recording medium and the first surfaces 121a of the air bearing surface of the slider 120 shown in FIGS. 37 and 38, the pressure moving the slider 120 away from the recording medium. In the air bearing surface of the slider 120 shown in FIGS. 37 and 38, the second surface 121b is disposed near the air inflow end, and the third surface 121c is disposed closer to the air outflow end than the second surface 121b is. Here, while the recording medium is rotating, the air passing through between the second surface 121b and the recording medium increases in volume when it reaches the space between the third surface 121c and the recording medium. Accordingly, a negative pressure which draws the slider 120 toward the recording medium is generated between the third surface 121c and the recording medium. As a result, while the recording medium is rotating, the slider 120 flies over the recording medium, being inclined such that the air outflow end is closer to the recording medium than the air inflow end is. The inclination of the air bearing surface of the slider 120 with respect to the surface of the recording medium is designed to fall within 1°, for example. The amount of flying of the slider 120 can be reduced by appropriately designing the shape of the air bearing surface.

The slider 120 is fabricated as follows. First, a wafer that includes a plurality of rows of portions to be sliders (hereinafter called slider portions), each of the slider portions including the thin-film magnetic head element 122, is cut in one direction to form blocks called bars each of which includes a row of slider portions. The surface of this bar to be the air bearing surface is then lapped into a lapped surface. Then, first photoresist masks are formed by photolithography on a portion of this lapped surface, the portion being to be the first surfaces 121a. Using the first photoresist masks, the lapped surface is selectively etched to form a stepped surface that has the first difference in level from the lapped surface. The first photoresist masks are then removed. Then, a second photoresist mask is formed by photolithography on the portion of the lapped surface that is to be the first surfaces 121a and on a portion of the stepped surface that is to be the second surface 121b. Using this second photoresist mask, the stepped surface is selectively etched to form the third surface 121c having the second difference in level from the lapped surface. In this way, the first surfaces 121a, the second surface 121b, and the third surface 121c are formed. Then, the bar is cut into the individual sliders 120.

FIG. 39 is a sectional view illustrating the slider 120 and a recording medium 140 in a state in which the recording medium 140 is at rest. In FIG. 39, the slider 120 is shown as sectioned along line 39—39 of FIG. 37. FIG. 40 shows the slider 120 as viewed from the upper side of FIG. 37.

As shown in FIG. 39, the greater part of the slider 120 is made up of the substrate 101 made of aluminum oxide and titanium carbide, for example. The rest of the slider 120 is made up of an insulating portion 127 of alumina, for example, and the thin-film magnetic head element 122 and so on formed in the insulating portion 127. The greater part of the insulating portion 127 is the overcoat layer 117.

In the slider 120 shown in FIGS. 39 and 40, a protection layer 128 of a material such as diamond-like carbon (DLC) is formed on the air bearing surface so as to protect the bottom shield layer 103, the bottom pole layer 108, the top pole tip 110, the top pole layer 116 and others from corrosion.

FIG. 41 is a sectional view illustrating the slider 120 and the recording medium 140 in a state in which the recording medium 140 has just started rotation from a resting state. FIG. 42 shows a state in which the recording medium 140 is rotating and the slider 120 is flying over the surface of the recording medium 140 to perform reading and writing with the thin-film magnetic head element 122. While the slider 120 is flying, the minimum distance H11 between the slider 120 and the recording medium 140 is about 8 to 10 nm, and the distance H12 between the air outflow end of the slider 120 and the recording medium 140 is about 100 to 500 nm.

Measures for improving the performance of a hard disk drive, such as areal recording density in particular, include increasing a linear recording density and increasing a track density. To design a high-performance hard disk drive, specific measures to be taken for implementing the recording head, the reproducing head or the thin-film magnetic head as a whole differ depending on whether linear recording density or track density is emphasized. That is, if priority is given to track density, a reduction in track width is required for both the recording head and the reproducing head, for example.

If priority is given to linear recording density, it is required for the reproducing head, for example, to improve the reproducing output and to reduce a shield gap length, that is, the distance between the bottom shield layer and the top shield layer. Furthermore, it is required to reduce the distance between the recording medium and the thin-film magnetic head element (hereinafter called a magnetic space).

A reduction in magnetic space is achieved by reducing the amount of flying of the slider. A reduction in magnetic space contributes not only to an improvement in the reproducing output of the reproducing head but also to an improvement in the overwrite property of the recording head.

The amount of flying of the slider can be reduced, for example, by forming the first, second, and third surfaces having differences in level from one another in the air bearing surface of the slider as shown in FIGS. 37 and 38.

According to the conventional method of manufacturing a slider, a wafer is cut in one direction to form a plurality of bars, and the bars are lapped to have a lapped surface, followed by formation of the first to third surfaces in the lapped surface of each bar. The step of forming the first to third surfaces in the lapped surface can be performed for a plurality of bars at a time. To this end, however, it is necessary that the plurality of bars be placed in a prescribed arrangement and then subjected to mask-forming and etching processes. Thus, the conventional method involves a large number of steps for manufacturing a slider, which increases the manufacturing cost of the slider.

On the other hand, as the magnetic space is reduced, the slider is likely to collide with the recording medium, which can result in damage to the recording medium and the thin-film magnetic head element. To avoid this, it is required to enhance the smoothness of the recording medium surface. However, the slider easily sticks to the medium if the smoothness of the recording medium surface is enhanced. This results in a problem that the slider is harder to take off from the recording medium when the recording medium starts rotation from a resting state in which the slider is in contact with the recording medium.

Conventionally, a crown or a camber is formed on the air bearing surface of the slider in order to prevent the slider from sticking to the recording medium. A crown refers to a convex surface which gently curves along the length of the slider 120 as shown in FIG. 39. A camber refers to a convex surface which gently curves along the width of the slider 120 as shown in FIG. 40. The crown has a difference of elevation C1 on the order of 10 to 50 nm. The camber has a difference of elevation C2 on the order of 5 to 20 nm.

Crowns are conventionally formed, for example, by changing the orientation of the bar with respect to the surface plate when lapping the air bearing surface of the bar.

Cambers are conventionally formed by the following method, for example. That is, after lapping the air bearing surface of the bar to adjust MR height, slits are made in the bar, using a diamond grinder or the like, at positions at which the slider portions are to be separated. Then, the air bearing surface of the bar is re-lapped lightly on a concave surface plate.

In the above-described method for forming cambers, after the MR height is precisely adjusted by lapping the air bearing surface of the bar, the air bearing surface of the bar is lapped again by about 10 to 20 nm in order to form the camber. This results in a problem that the MR height can deviate from its desired value. Further, according to this method, when the air bearing surface of the bar is lapped on the concave surface plate, the bar can be scratched by stain and dust on the surface plate, which results in a problem of a lower yield of the thin-film magnetic heads. Further, according to this method, when the air bearing surface of the bar is lapped on the concave surface plate, chippings of the electrode layers connected to the MR element may be jammed and spread between the air bearing surface and the surface plate, producing a defect called a smear. The smear sometimes causes an electric short circuit between the MR element and the shield layers. The short circuit can lower the sensitivity of the reproducing head and produce noise in the reproducing output, thereby deteriorating the performance of the reproducing head.

Further, if crowns/cambers are to be formed on the air bearing surfaces of the sliders, the manufacturing costs of the sliders are raised because of the steps of forming the crowns/cambers.

OBJECTS AND SUMMARY OF THE INVENTION

A first object of the invention is to provide a thin-film magnetic head and a slider for a thin-film magnetic head which can be manufactured in a smaller number of steps, and a method of manufacturing such a thin-film magnetic head and such a slider.

A second object of the invention is, in addition to the aforementioned first object, to provide a slider for a thin-film magnetic head and a method of manufacturing same, which make it possible to reduce the magnetic space, prevent the slider from sticking to the recording medium, and prevent damages to the recording medium or the thin-film magnetic head due to a collision between the slider and the recording medium.

A first thin-film magnetic head of the invention comprises:

a recording head section having a recording head and a first medium facing surface that faces toward a recording medium; and a reproducing head section having a reproducing head and a second medium facing surface that faces toward the recording medium, wherein the recording head section and the reproducing head section are bonded to each other so that the first medium facing surface and the second medium facing surface are continuous.

The first thin-film magnetic head of the invention is completed by bonding the recording head section and the reproducing head section to each other. The recording head section and the reproducing head section can therefore be fabricated separately in large lots at a time.

In the first thin-film magnetic head of the invention, the recording head section may include a recording head section body for accommodating the recording head, the recording head section body having the first medium facing surface and a back surface located on the opposite side from the first medium facing surface. The recording head may have a conductor that is exposed in the back surface and electrically connected to an external device, and an induction-type electromagnetic transducer electrically connected to the conductor. The induction-type electromagnetic transducer may have: a thin-film coil electrically connected to the conductor; first and second pole portion layers opposed to each other and disposed near the first medium facing surface; a magnetic-path-forming part that is disposed so as to surround a part of the thin-film coil and couples the first pole portion layer and the second pole portion layer to each other; and a gap part provided between the first and second pole portion layers. Each of the first and second pole portion layers may have a protrusion for defining a recording track width, the protrusion having an end surface exposed in the first medium facing surface. The thickness of each of the first and second pole portion layers may define a throat height.

In the first thin-film magnetic head of the invention, the reproducing head section may include a reproducing head section body for accommodating the reproducing head, the reproducing head section body having the second medium facing surface and a back surface located on the opposite side from the second medium facing surface. The reproducing head may have a conductor that is exposed in the back surface and electrically connected to an external device, and a magnetoresistive element that is disposed near the second medium facing surface and electrically connected to the conductor.

A method of manufacturing the first thin-film magnetic head of the invention is provided for manufacturing a thin-film magnetic head comprising: a recording head section having a recording head and a first medium facing surface that faces toward a recording medium; and a reproducing head section having a reproducing head and a second medium facing surface that faces toward the recording medium, wherein the recording head section and the reproducing head section are bonded to each other so that the first medium facing surface and the second medium facing surface are continuous. The method comprises the steps of:

fabricating the recording head section;

fabricating the reproducing head section separately from the recording head section; and bonding the recording head section and the reproducing head section to each other.

According to the method of manufacturing the first thin-film magnetic head of the invention, the recording head section and the reproducing head section are fabricated separately, and they are bonded to each other to complete the thin-film magnetic head. Thus, it is possible to fabricate the recording head section and the reproducing head section in large lots at a time separately.

In the method of manufacturing the first thin-film magnetic head of the invention, the step of fabricating the recording head section may include the step of forming a plurality of recording heads on a first wafer, and the step of fabricating the reproducing head section may include the step of forming a plurality of reproducing heads on a second wafer.

In the method of manufacturing the first thin-film magnetic head of the invention, the recording head section may include a recording head section body for accommodating the recording head, the recording head section body having the first medium facing surface and a back surface located on the opposite side from the first medium facing surface. The step of fabricating the recording head section may include the steps of: forming a conductor that is exposed in the back surface and electrically connected to an external device; and forming an induction-type electromagnetic transducer. The induction-type electromagnetic transducer may have: a thin-film coil electrically connected to the conductor; first and second pole portion layers opposed to each other and disposed near the first medium facing surface; a magnetic-path-forming part that is disposed so as to surround a part of the thin-film coil and couples the first pole portion layer and the second pole portion layer to each other; and a gap part provided between the first and second pole portion layers. Each of the first and second pole portion layers may have a protrusion for defining a recording track width, the protrusion having an end surface exposed in the first medium facing surface. The thickness of each of the first and second pole portion layers may define a throat height.

In the method of manufacturing the first thin-film magnetic head of the invention, the reproducing head section may include a reproducing head section body for accommodating the reproducing head, the reproducing head section body having the second medium facing surface and a back surface located on the opposite side from the second medium facing surface. The step of fabricating the reproducing head section may include the steps of: forming a conductor that is exposed in the back surface and electrically connected to an external device; and forming a magnetoresistive element that is disposed near the second medium facing surface and electrically connected to the conductor.

A second thin-film magnetic head of the invention comprises: a conductor that is electrically connected to an external device; an induction-type electromagnetic transducer electrically connected to the conductor; and a body for accommodating the conductor and the induction-type electromagnetic transducer. The body has a medium facing surface that faces toward a recording medium, and a back surface located on the opposite side from the medium facing surface. The conductor is exposed in the back surface. The induction-type electromagnetic transducer is stacked on the conductor. The induction-type electromagnetic transducer has: a thin-film coil electrically connected to the conductor; first and second pole portion layers opposed to each other and disposed near the medium facing surface; a magnetic-path-forming part that is disposed so as to surround a part of the thin-film coil and couples the first pole portion layer and the second pole portion layer to each other; and a gap part provided between the first and second pole portion layers. Each of the first and second pole portion layers has a protrusion for defining a recording track width, the protrusion having an end surface exposed in the medium facing surface. The thickness of each of the first and second pole portion layers defines a throat height.

A method of manufacturing the second thin-film magnetic head of the invention is provided for manufacturing a thin-film magnetic head comprising: a conductor that is electrically connected to an external device; an induction-type electromagnetic transducer electrically connected to the conductor; and a body for accommodating the conductor and the induction-type electromagnetic transducer, wherein the body has a medium facing surface that faces toward a recording medium, and a back surface located on the opposite side from the medium facing surface. The method comprises the steps of: forming the conductor; and forming the induction-type electromagnetic transducer to be stacked on the conductor. The induction-type electromagnetic transducer has: a thin-film coil electrically connected to the conductor; first and second pole portion layers opposed to each other and disposed near the medium facing surface; a magnetic-path-forming part that is disposed so as to surround a part of the thin-film coil and couples the first pole portion layer and the second pole portion layer to each other; and a gap part provided between the first and second pole portion layers. Each of the first and second pole portion layers has a protrusion for defining a recording track width, the protrusion having an end surface exposed in the medium facing surface. The thickness of each of the first and second pole portion layers defines a throat height.

According to the method of manufacturing the second thin-film magnetic head of the invention, the conductor is exposed in the back surface of the body, and the induction-type electromagnetic transducer is stacked on the conductor. Each of the first and second pole portion layers of the induction-type electromagnetic transducer has a protrusion for defining the recording track width, and the end surface of each protrusion is exposed in the medium facing surface.

A slider for a thin-film magnetic head of the invention comprises:

a slider section having a recording head and a first medium facing surface that faces toward a rotating recording medium; and a reproducing head section having a reproducing head and a second medium facing surface that faces toward the recording medium, wherein:

the first medium facing surface has concavities and convexities for controlling the orientation of the slider section while the recording medium is rotating, and the slider section and the reproducing head section are bonded to each other so that the first medium facing surface and the second medium facing surface are continuous.

The slider for a thin-film magnetic head of the invention is completed by bonding the slider section and the reproducing head section to each other. The slider section and the reproducing head section can therefore be fabricated separately in large lots at a time.

In the slider for a thin-film magnetic head of the invention, the recording head may include an induction-type electromagnetic transducer, and the reproducing head may include a magnetoresistive element.

In the slider for a thin-film magnetic head of the invention, the first medium facing surface may have a first surface closer to the reproducing head section, a second surface farther from the reproducing head section, and a border portion between the first surface and the second surface. The first surface and the second surface may be slanted with respect to each other such that the first and second surfaces make a convex shape bent at the border portion.

While the recording medium is rotating, at least either the first surface or the second surfaces may slant with respect to the surface of the recording medium such that the smaller the distance from a point in at least either the first or second surface to the border portion, the smaller the distance from that point to the recording medium.

In the slider for a thin-film magnetic head of the invention, where the first medium facing surface has the first and second surfaces and the border portion, the slider section may be in contact with the surface of the recording medium while the recording medium is at rest, and may be off the surface of the recording medium while the recording medium is rotating. In this case, when the slider section comes into contact with the surface of the recording medium, the border portion may be the first to make contact with the surface of the recording medium. On the other hand, when the slider section takes off from the surface of the recording medium, the border portion may be the last to depart from the surface of the recording medium.

Regardless of whether the recording medium is rotating or at rest, the slider section may be in contact with the surface of the recording medium at the border portion, and the first surface and the second surface may slant with respect to the surface of the recording medium.

The first medium facing surface may have a recess formed in a region including the border portion.

A method of manufacturing a slider for a thin-film magnetic head of the invention is provided for manufacturing a slider comprising: a slider section having a recording head and a first medium facing surface that faces toward a rotating recording medium; and a reproducing head section having a reproducing head and a second medium facing surface that faces toward the recording medium, wherein the first medium facing surface has concavities and convexities for controlling the orientation of the slider section while the recording medium is rotating, and the slider section and the reproducing head section are bonded to each other so that the first medium facing surface and the second medium facing surface are continuous.

The method of manufacturing the slider of the invention comprises the steps of: fabricating the slider section; fabricating the reproducing head section separately from the slider section; and bonding the slider section and the reproducing head section to each other.

According to the method of manufacturing the slider of the invention, the slider section and the reproducing head section are fabricated separately, and they are bonded to each other to complete the slider. Thus, it is possible to fabricate the slider section and the reproducing head section in large lots at a time separately.

In the method of manufacturing the slider of the invention, the recording head may include an induction-type electromagnetic transducer, and the reproducing head may include a magnetoresistive element.

In the method of manufacturing the slider of the invention, the step of fabricating the slider section may include the step of forming a plurality of recording heads on a first wafer, and the step of fabricating the reproducing head section may include the step of forming a plurality of reproducing heads on a second wafer.

In the method of manufacturing the slider of the invention, the step of fabricating the slider section may include the steps of: forming a plurality of recording heads and a plurality of first medium facing surfaces on a first wafer to thereby form a first slider section aggregate including a plurality of slider sections arranged in a plurality of rows; and cutting the first slider section aggregate to thereby form a second slider section aggregate including a plurality of slider sections arranged in a row. The step of fabricating the reproducing head section may include the steps of: forming a plurality of reproducing heads on a second wafer to thereby form a first reproducing head section aggregate including a plurality of reproducing head sections arranged in a plurality of rows; and cutting the first reproducing head section aggregate to thereby form a second reproducing head section aggregate including a plurality of reproducing head sections arranged in a row. The step of bonding the slider section and the reproducing head section to each other may include the step of bonding the second slider section aggregate and the second reproducing head section aggregate to each other to thereby fabricate a slider aggregate including a plurality of sliders arranged in a row. The method of manufacturing the slider may further comprise the step of cutting the slider aggregate into a plurality of sliders separated from one another.

The method of manufacturing the slider of the invention may further comprise the step of lapping the first medium facing surface and the second medium facing surface so as to flatten the first and second medium facing surfaces, after the step of bonding the slider section and the reproducing head section to each other.

The method of manufacturing the slider of the invention may further comprise, after the step of bonding the slider section and the reproducing head section to each other, the step of lapping the first medium facing surface so as to allow the first medium facing surface to have a first surface closer to the reproducing head section, a second surface farther from the reproducing head section, and a border portion between the first and second surfaces, and to allow the first and second surfaces to slant with respect to each other such that the first and second surfaces make a convex shape bent at the border portion. In this case, the method may further comprise the step of forming a recess in a region including the border portion in the first medium facing surface.

In the method of manufacturing the slider of the invention, the slider section and the reproducing head section may be bonded to each other using a ceramic-based adhesive in the step of bonding the slider section and the reproducing head section to each other.

In the method of manufacturing the slider of the invention, in the step of bonding the slider section and the reproducing head section to each other, a thermosetting adhesive may be put between the slider section and the reproducing head section, and the adhesive may be cured by heating at a temperature of 300° C. or less to thereby bond the slider section and the reproducing head section to each other.

In the method of manufacturing the slider of the invention, the step of fabricating the slider section may include the steps of: forming a plurality of recording heads on one surface of a wafer; and removing the wafer by grinding the wafer from the other surface thereof. The recording heads may each have a conductor that is exposed in a surface resulting from the grinding and electrically connected to an external device. In this case, in the step of removing the wafer, the wafer may be ground from the other surface thereof with a support plate placed on the plurality of recording heads.

In the method of manufacturing the slider of the invention, the step of fabricating the reproducing head section may include the steps of: forming a plurality of reproducing heads on one surface of a wafer; and removing at least part of the wafer by grinding the wafer from the other surface thereof. In this case, in the step of bonding the slider section and the reproducing head section to each other, a surface of the reproducing head section opposite to the surface resulting from the grinding may be bonded to the slider section. In the step of removing the wafer, the wafer may be ground from the other surface thereof with a support plate placed on the plurality of reproducing heads.

Other and further objects, features and advantages of the invention will appear more fully from the following description.

DETAILED DESCRIPTION OF THE PREFERRED EMBODIMENT

An embodiment of the invention will now be described in detail with reference to the accompanying drawings.

Figure 1:
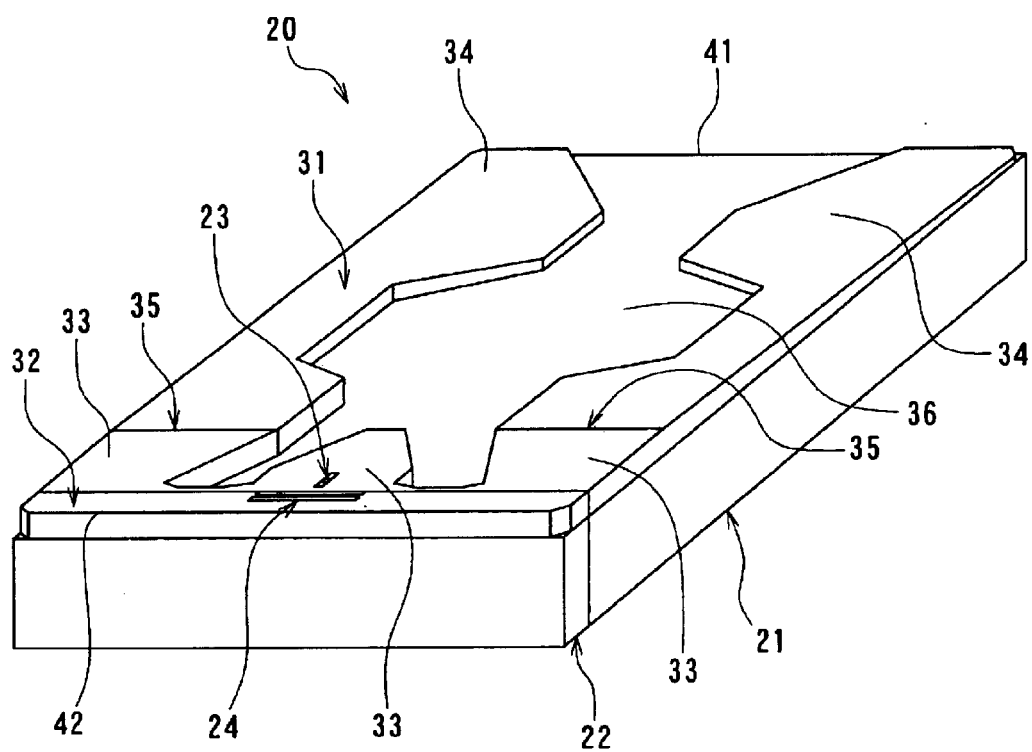
FIG. 1 is a perspective view of a slider of an embodiment of the invention.
Figure 2:
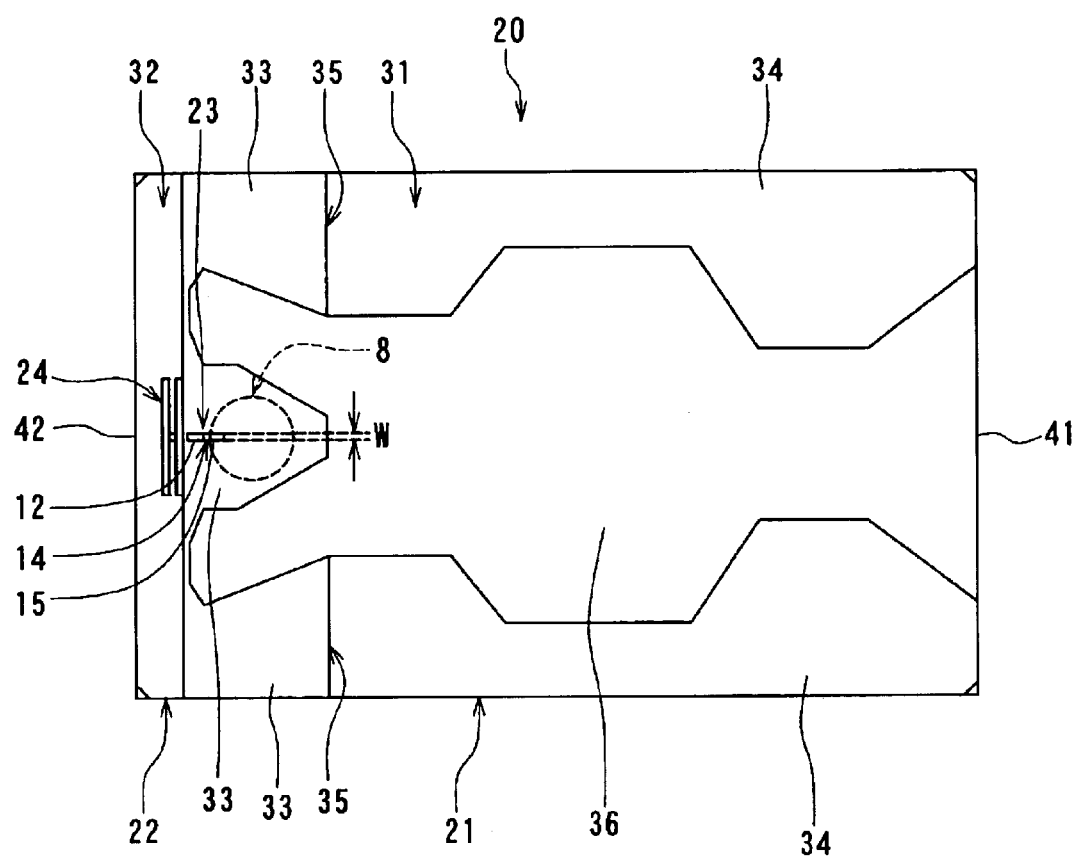
FIG. 2 is a bottom view of the slider of the embodiment of the invention.

Reference is now made to FIGS. 1 and 2 to describe a configuration of a slider for a thin-film magnetic head (hereinafter simply referred to as a slider) according to the embodiment of the invention, and a configuration of a thin-film magnetic head according to the embodiment. FIG. 1 is a perspective view of the slider of the embodiment. FIG. 2 is a bottom view of the slider of the embodiment. The slider of the embodiment incorporates the thin-film magnetic head of the embodiment.

The slider 20 according to the embodiment comprises a slider section 21 and a reproducing head section 22. The entire slider section 21, the entire reproducing head section 22 and the entire slider 20 each have a generally cuboid shape. The slider section 21 corresponds to the recording head section of the invention.

The slider section 21 has: a first medium facing surface 31 facing toward a rotating recording medium; an air inflow end 41 serving as an end from which an airflow generated by the rotation of the recording medium flows in; and a recording head 23. The recording head 23 is disposed near the first medium facing surface 31, near the border between the slider section 21 and the reproducing head section 22.

The reproducing head section 22 has: a second medium facing surface 32 facing toward the recording medium; an air outflow end 42 serving as an end from which the airflow generated by the rotation of the recording medium flows out; and a reproducing head 24. The reproducing head 24 is disposed near the second medium facing surface 32, near the border between the slider section 21 and the reproducing head 22.

The slider section 21 and the reproducing head section 22 are bonded to each other such that the first medium facing surface 31 and the second medium facing surface 32 are continuous, and that the air inflow end 41 and the air outflow end 42 are disposed on opposite sides with the first and second medium facing surfaces 31 and 32 in between. The recording head 23 and the reproducing head 24 are disposed close to each other. The thin-film magnetic head of the embodiment includes the recording head 23 and the reproducing head 24.

The first medium facing surface 31 has concavities and convexities for controlling the orientation of the slider section 21 during the rotation of the recording medium. Specifically, the first medium facing surface 31 has a first surface 33 closer to the reproducing head section 22, a second surface 34 closer to the air inflow end 41, and a border portion 35 between the first and second surfaces 33 and 34. The first surface 33 includes two portions disposed near the sidewalls of the slider section 21 along the width thereof, and a portion disposed near the end of the first surface 33 closer to the reproducing head section 22. The second surface 34 includes two portions disposed near the sidewalls of the slider section 21 along the width thereof, the two portions extending in a direction of air passage and being connected to the two portions of the first surface 33. The first medium facing surface 31 further has a third surface 36 disposed between the two portions of the second surface 34 and extending in the direction of air passage.

The second surface 34 is slanted with respect to the first surface 33 such that the first and second surfaces 33 and 34 make a convex shape (roof-like shape) bent at the border portion 35. The first and second surfaces 33 and 34 preferably form an angle of 30° or smaller, and more preferably an angle of 10° or smaller. It is also preferable that the angle formed between the first and second surfaces 33 and 34 does not fall below 0.1°.

The first and third surfaces 33 and 36 lie in parallel to the surface of the slider section 21 opposite from the first medium facing surface 31. The second and third surfaces 34 and 36 have such a difference in level that the third surface 36 is located farther from the recording medium than the second surface 34 is. This difference in level varies gradually so as to increase with decreasing distance from the reproducing head section 22. In other words, the second surface 34 makes a plane that slants with respect to the third surface 36. The second and third surfaces 34 and 36 preferably form an angle of 30° or smaller, and more preferably an angle of 10° or smaller. It is also preferable that the angle formed between the second and third surfaces 34 and 36 does not fall below 0.1°.

In the first medium facing surface 31, the length from the border portion 35 to the end of the first medium facing surface 31 closer to the reproducing head section 22 is preferably 50% or less of the length from the end thereof closer to the reproducing head section 22 to the air inflow end 41.

The slider 20 of the embodiment can provide a force to cause the slider section 21 to move apart from or move toward the recording medium by means of an airflow according to the shape of the concavities and convexities of the first medium facing surface 31. Therefore, the orientation of the slider 20 during the rotation of the recording medium can be controlled by appropriately designing the shape of the concavities and convexities of the first medium facing surface 31.

Although not shown in FIGS. 1 and 2, the slider 20 may include a protection layer to cover the first and second medium facing surfaces 31 and 32. The protection layer is made of alumina or diamond-like carbon, for example.

A method of manufacturing the slider 20 of the embodiment, and the configurations of the recording head 23 and the reproducing head 24 of the embodiment will now be described. The method of manufacturing the slider 20 includes the steps of fabricating the slider section 21, fabricating the reproducing head section 22 separately from the slider section 21, and bonding the slider section 21 and the reproducing head section 22 to each other.

Figure 3:
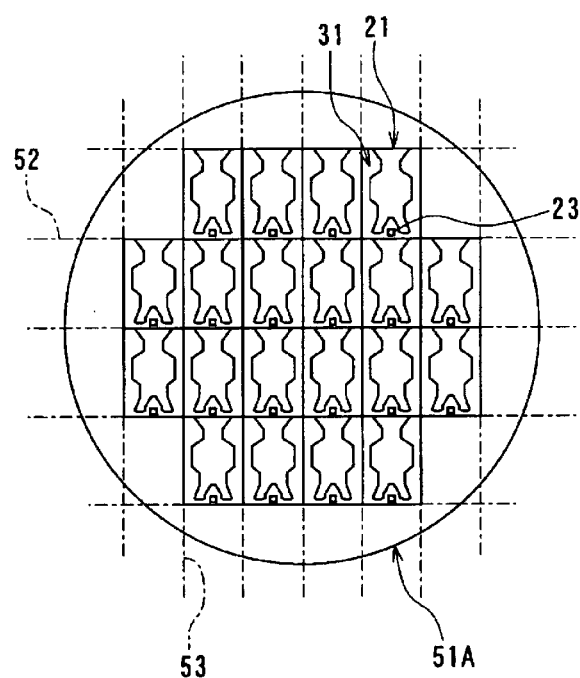
FIG. 3 is a top view of a first slider section aggregate of the embodiment of the invention.

First, the step of fabricating the slider section 21 will be described. As shown in FIG. 3, the step of fabricating the slider section 21 includes: the step of forming a plurality of first medium facing surfaces 31 and a plurality of recording heads 23 corresponding to a plurality of slider sections 21 on a first wafer to thereby form a first slider section aggregate 51A including a plurality of slider sections 21 arranged in a plurality of rows; and the step of cutting the first slider section aggregate 51A at positions denoted by reference numeral 52 in FIG. 2, thereby forming second slider section aggregates each including a plurality of slider sections 21 arranged in a row. The first wafer may be made of silicon, or of a ceramic material such as aluminum oxide and titanium carbide.

Figure 4:
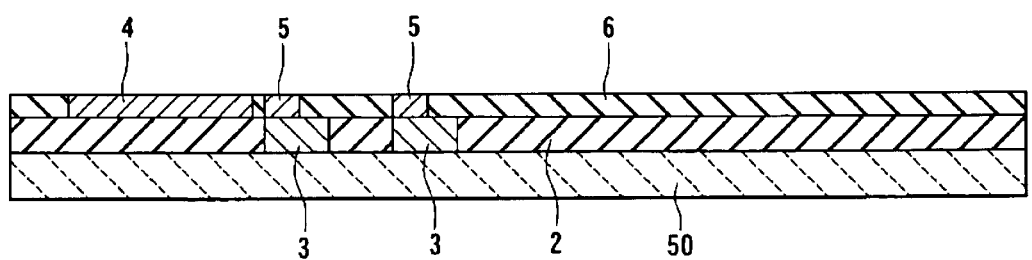
FIG. 4 is a sectional view for illustrating the step of fabricating a slider section of the embodiment of the invention.

Hereinafter, the step of fabricating the slider section 21 will be detailed with reference to FIG. 4 through FIG. 9. FIG. 4 through FIG. 9 are sectional views for illustrating the step of fabricating the slider section 21. In the step, as shown in FIG. 4, an insulating layer 2 made of alumina, for example, is initially formed on one of surfaces of the first wafer 50. The insulating layer 2 has a thickness of 10 $\mu$m, for example.

Next, the insulating layer 2 is partially etched to form two openings in the insulating layer 2. Then, two conductors 3 each made of a conductive material are selectively formed in the two openings by plating, for example. The conductive material may be Cu, for example. Then, excesses of the conductors 3 protruding from the openings are removed off by chemical mechanical polishing (hereinafter referred to as CMP), for example, so that the top surfaces of the insulating layer 2 and the conductors 3 are flattened.

Next, a magnetic layer 4 is formed on the insulating layer 2 by plating, for example. At the same time, two coupling layers 5 are formed on the two conductors 3. The magnetic layer 4 and the coupling layers 5 are each made of a conductive magnetic material such as Permalloy (NiFe). The magnetic layer 4 and the coupling layers 5 each have a thickness of 3 $\mu$m, for example. Then, an insulating layer 6 made of alumina, for example, is formed over the entire surface to a thickness of 3 $\mu$m, for example. The insulating layer 6 is then polished by CMP, for example, so that the magnetic layer 4 and the coupling layers 5 are exposed, whereby the surface of the insulating layer 6 is flattened.

Figure 5:
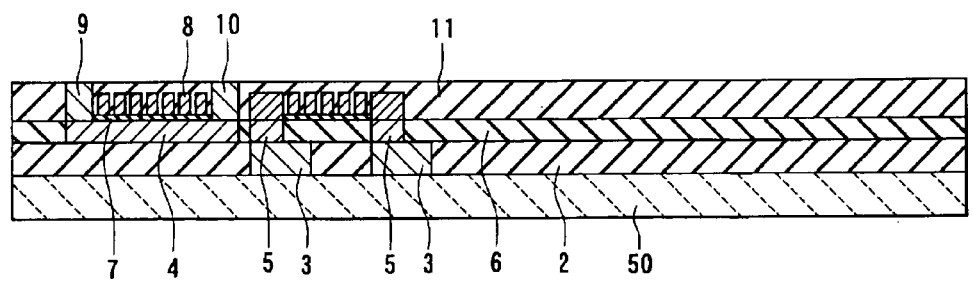
FIG. 5 is a sectional view for illustrating a step that follows FIG. 4.

Next, as shown in FIG. 5, an insulating film 7 is formed on a portion of the top surfaces of the magnetic layer 4 and the insulating layer 6 where a thin-film coil 8 is to be formed later. Next, the thin-film coil 8 is formed on the insulating film 7 by plating, for example. The thin-film coil 8 is made of Cu, for example. The thin-film coil 8 has a thickness of 1.5 $\mu$m, for example. The inner and outer ends of the winding of the thin-film coil 8 are electrically connected to different coupling layers 5. The ends of the winding of the thin-film coil 8 are thereby electrically connected to the two conductors 3.

Next, magnetic layers 9 and 10 are formed on the magnetic layer 4 by plating, for example. The magnetic layer 9 is disposed outside the outermost end of the thin-film coil 8. The magnetic layer 10 is disposed inside the innermost end of the thin-film coil 8. The magnetic layers 9 and 10 are each made of CoNiFe, for example. The magnetic layers 9 and 10 each have a thickness of 3 $\mu$m, for example. Then, an insulating layer 11 made of alumina, for example, is formed over the entire surface to a thickness of 3 $\mu$m, for example. The insulating layer 11 is then polished by CMP, for example, so that the magnetic layers 9 and 10 are exposed, whereby the surface of the insulating layer 11 is flattened.

Figure 6:
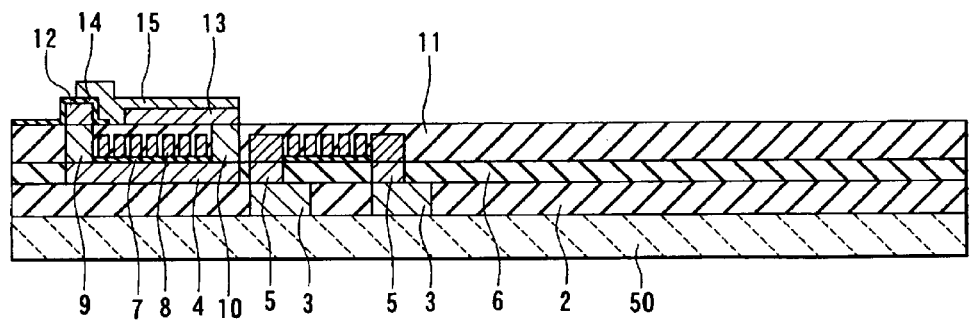
FIG. 6 is a sectional view for illustrating a step that follows FIG. 5.

Next, as shown in FIG. 6, a first pole portion layer 12 is formed on the magnetic layer 9, and a magnetic layer 13 is formed on the magnetic layer 10 and the insulating layer 11. The magnetic layer 13 is opposed to the magnetic layer 4 with the thin-film coil 8 in between. The first pole portion layer 12 and the magnetic layer 13 are separated from each other by a specific interval. The first pole portion layer 12 and the magnetic layer 13 are preferably made of a high saturation flux density material such as FeCo. The pole portion layer 12 and the magnetic layer 13 each have a thickness of 1 $\mu$m, for example.

Next, a recording gap layer 14 made of alumina, for example, is formed so as to cover the first pole portion layer 12. The recording gap layer 14 has a thickness of 0.1 $\mu$m, for example. Then, a second pole portion layer 15 is formed in an area between the first pole portion layer 12 and the magnetic layer 13 on the insulating layer 11 and on the periphery of that area. A part of the pole portion layer 15 lies on the recording gap layer 14 on the pole portion layer 12. Another part of the pole portion layer 15 lies on the magnetic layer 13. The pole portion layer 15 is preferably made of a high saturation flux density material such as FeCo. The pole portion layer 15 has a thickness of 1 $\mu$m, for example.

Figure 7:
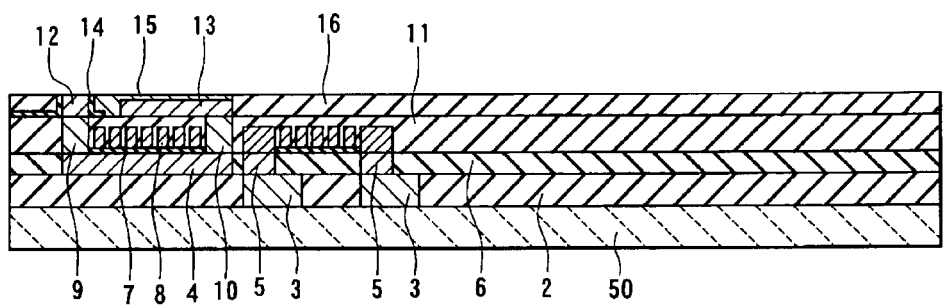
FIG. 7 is a sectional view for illustrating a step that follows FIG. 6.

Next, as shown in FIG. 7, an insulating layer 16 made of alumina, for example, is formed over the entire surface. The insulating layer 16 is then polished by CMP, for example, so that the pole portion layers 12 and 15 are exposed, whereby the surface of the insulating layer 16 is flattened. In the surface resulting from the polishing, the pole portion layers 12 and 15 are opposed to each other with the recording gap layer 14 in between.

Next, an etching mask (not shown) for defining the recording track width is formed on the pole portion layers 12, 15 and the recording gap layer 14 located therebetween. For example, this etching mask is made of a photoresist and is formed by photolithography.

Figure 8:
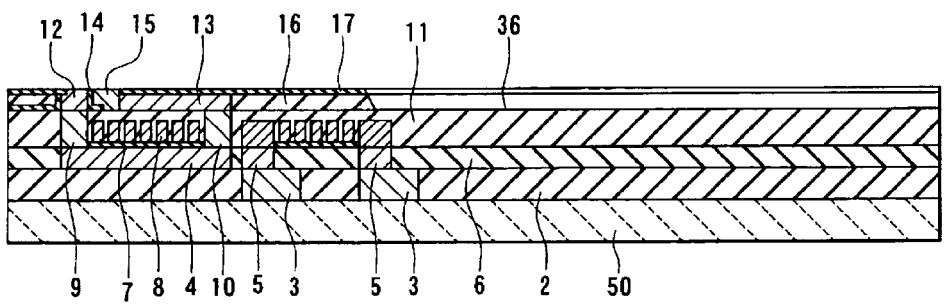
FIG. 8 is a sectional view for illustrating a step that follows FIG. 7.

Next, as shown in FIG. 8, each of the pole portion layers 12, 15 and the recording gap layer 14 is partially etched by using the foregoing etching mask. This forms a protrusion on the top of each of the pole portion layers 12, 15 and the recording gap layer 14, the protrusion defining the recording track width. The etching is effected by dry etching such as reactive ion etching and ion milling. The etching is conducted to a depth of 0.5 $\mu$m or greater, for example. The width W (see FIG. 2) of the end surface of each protrusion is the recording track width. This recording track width shall be 0.1 $\mu$m or smaller, for example.

Next, an insulating film 17 made of alumina or diamond-like carbon, for example, is formed over the entire surface. The insulating film 17 has a thickness of 0.7 $\mu$m, for example. The insulating film 17 is then polished by CMP, for example, so that the pole portion layers 12, 15 and the recording gap layer 14 are exposed, whereby the surface of the insulating film 17 is flattened.

Next, an etching mask (not shown) for forming concavities and convexities intended to control the orientation of the slider section 21 is formed on the top surface of the layered structure shown in FIG. 8. For example, this etching mask is made of a photoresist and is formed by photolithography. Through the use of this etching mask, the top surface of the aforementioned layered structure is etched to form the concavities and convexities intended for orientation control. This etching is conducted to a depth of 2 to 3 μm, for example. This etching forms the third surface 36 of the first medium facing surface 31.

In this way, a plurality of slider sections 21 each including the recording head 23 are formed on the one surface of the first wafer 50.

Figure 9:
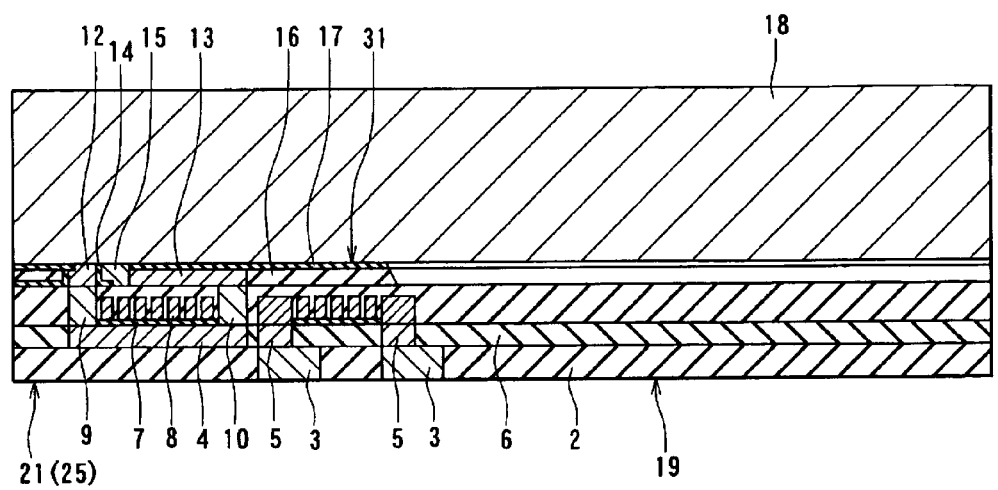
FIG. 9 is a sectional view for illustrating a step that follows FIG. 8.

Next, as shown in FIG. 9, a support plate 18 is placed on the plurality of slider sections 21, and attached to the slider sections 21. Then, the first wafer 50 is ground from the other surface (the bottom surface shown in FIG. 8) with a grinder, for example. The first wafer 50 is thereby removed and the conductors 3 are exposed.

In the manner as described above, the first slider section aggregate 51A shown in FIG. 3 is fabricated. The first slider section aggregate 51A is cut up at positions denoted by the reference numeral 52 in FIG. 3. This forms second slider section aggregates each including a plurality of slider sections 21 arranged in a row. The surfaces of the slider sections 21 where the pole portion layers 12, 15 and the recording gap layers 14 are exposed make the first medium facing surfaces 31. The surfaces of the slider sections 21 where the conductors 3 are exposed make back surfaces 19 (see FIG. 9) that are located on the opposite side from the first medium facing surfaces 31.

Each slider section 21 has a body 25 that accommodates the recording head 23. The body 25 has the first medium facing surface 31 and the back surface 19 that is located on the opposite side from this first medium facing surface 31. The body 25 corresponds to the recording head section body in the invention. The recording head 23 has the conductors 3 that are exposed in the back surface 19 and electrically connected to an external device, and an induction-type electromagnetic transducer electrically connected to the conductors 3. The induction-type electromagnetic transducer comprises: the thin-film coil 8 that is electrically connected to the conductors 3; the first and second pole portion layers 12 and 15 that are opposed to each other and disposed near the first medium facing surface 31; a magnetic-path-forming part that is disposed so as to surround a part of the thin-film coil 8 and couples the first pole portion layer 12 and the second pole portion layer 15 to each other; and the recording gap layer 14 provided between the first and second pole portion layers 12 and 15. The magnetic-path-forming part is made up of the magnetic layers 4, 9, 10 and 13.

Each of the first and second pole portion layers 12 and 15 has the protrusion for defining the recording track width. The end surface of each protrusion is exposed in the first medium facing surface 31. The thickness of each of the first and second pole portion layers 12 and 15 defines the throat height.

Figure 10:
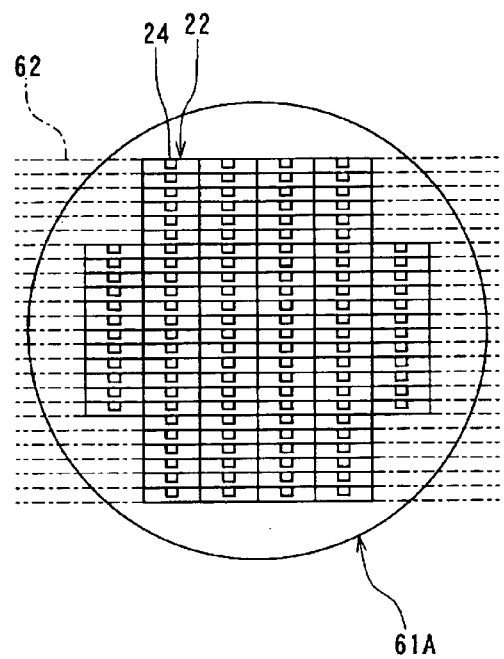
FIG. 10 is a top view of a first reproducing head section aggregate of the embodiment of the invention.

The step of fabricating the reproducing head section 22 will now be described. As shown in FIG. 10, the step of fabricating the reproducing head section 22 includes the steps of: forming a plurality of reproducing heads 24 on a second wafer to thereby form a first reproducing head section aggregate 61A including a plurality of reproducing head sections 22 arranged in a plurality of rows; and cutting the first reproducing head section aggregate 61A at positions denoted by reference numeral 62 in FIG. 10 to thereby obtain second reproducing head section aggregates each including a plurality of reproducing head sections 22 arranged in a row. The second wafer may be made of silicon, or a ceramic material such as aluminum oxide and titanium carbide.

Hereinafter, the step of fabricating the reproducing head section 22 will be detailed with reference to FIGS. 11A through 15A, and FIGS. 11B through 15B. FIGS. 11A through 15A and FIGS. 11B through 15B are sectional views for illustrating the step of fabricating the reproducing head section 22. FIGS. 11A through 15A are cross sections each orthogonal to the second medium facing surface 32 to be formed later. FIGS. 11B through 15B are cross sections each parallel to the second medium facing surface 32.

Figures 11A, 11B:
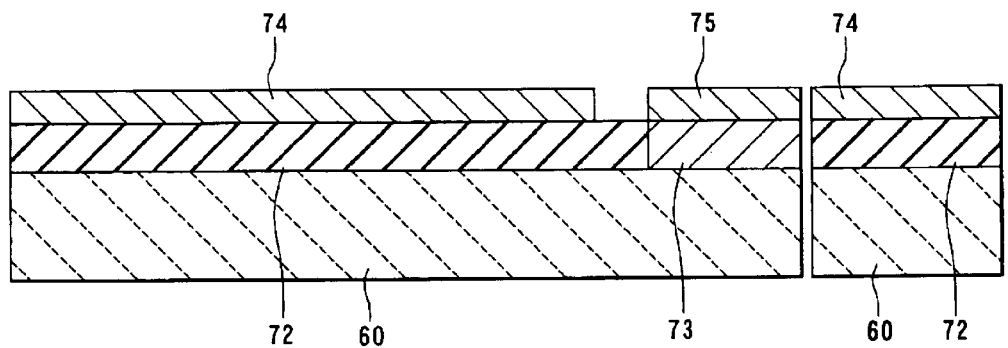
FIGS. 11A and 11B are sectional views for illustrating the step of fabricating a reproducing head section of the embodiment of the invention.

In the step of fabricating the reproducing head section 22, as shown in FIGS. 11A and 11B, an insulating layer 72 made of alumina, for example, is initially formed on one of surfaces of the second wafer 60. The insulating layer 72 has a thickness of 10 μm, for example. Next, the insulating layer 72 is partially etched to form two openings in the insulating layer 72. Then, two conductors 73 each made of a conductive material are selectively formed in the two openings by plating, for example. Note that only one of the conductors 73 is shown in FIG. 11A. The conductive material may be Cu, for example. Then, excesses of the conductors 73 protruding from the openings are removed off by CMP, for example, so that the top surfaces of the insulating layer 72 and the conductors 73 are flattened.

Next, a first shield layer 74 is formed on the insulating layer 72 by plating, for example. At the same time, two coupling layers 75 are formed on the two conductors 73. The first shield layer 74 and the coupling layers 75 are each made of a conductive magnetic material such as Permalloy (NiFe). The first shield layer 74 and the coupling layers 75 each have a thickness of 3 μm, for example.

Figures 12A, 12B:
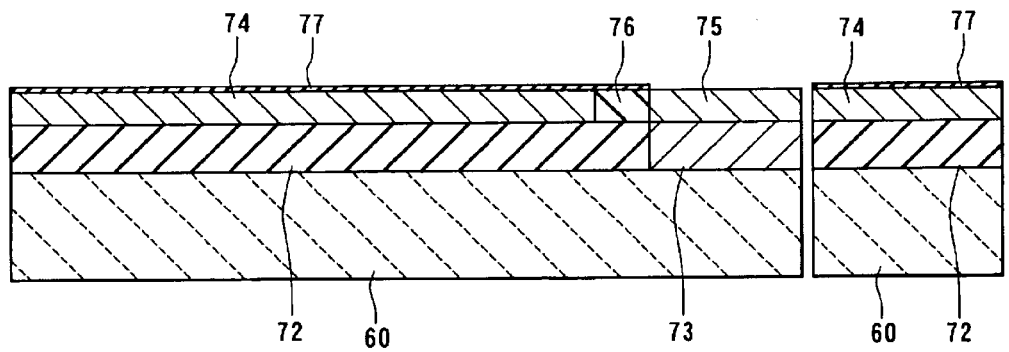
FIGS. 12A and 12B are sectional views for illustrating a step that follows FIGS. 11A and 11B.

Then, as shown in FIGS. 12A and 12B, an insulating layer 76 made of alumina, for example, is formed over the entire surface to a thickness of 3 μm, for example. The insulating layer 76 is then polished by CMP, for example, so that the first shield layer 74 and the coupling layers 75 are exposed, whereby the surface of the insulating layer 76 is flattened. Then, a first shield gap film 77 of an insulating material such as alumina is formed to a thickness of 30 nm, for example, so as to cover the first shield layer 74. The first shield gap film 77 is disposed in such a way that it does not cover the coupling layers 75.

Figures 13A, 13B:
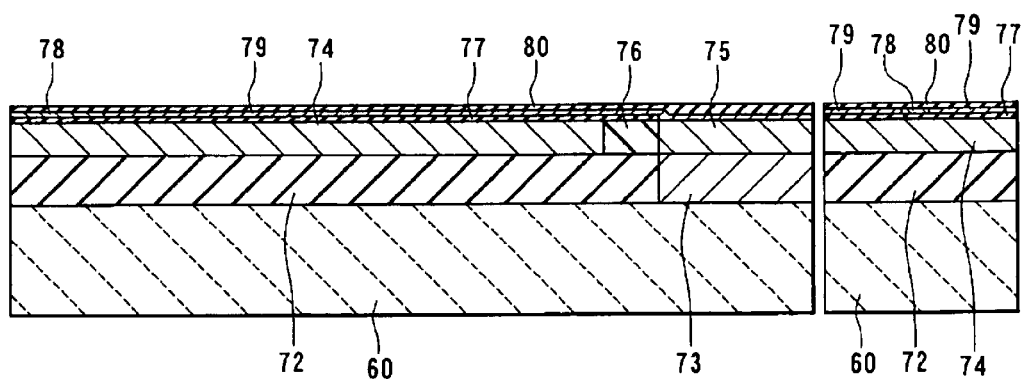
FIGS. 13A and 13B are sectional views for illustrating a step that follows FIGS. 12A and 12B.

Next, as shown in FIGS. 13A and 13B, an MR element 78 for reproduction is formed on the first shield gap film 77. The MR element 78 may be an element utilizing a magnetosensitive film that exhibits magnetoresistivity, such as an AMR element, a GMR element or a tunnel magnetoresistive (TMR) element. Then, a pair of electrode layers 79 to be electrically connected to the MR element 78 are formed on the first shield gap film 77. These two electrode layers 79 are electrically connected to different coupling layers 75. The MR element 78 is thereby electrically connected to the two conductors 73. Then, a second shield gap film 80 of an insulating material such as alumina is formed to a thickness of 30 nm, for example, so as to cover the MR element 78 and the electrode layers 79.

Figures 14A, 14B:
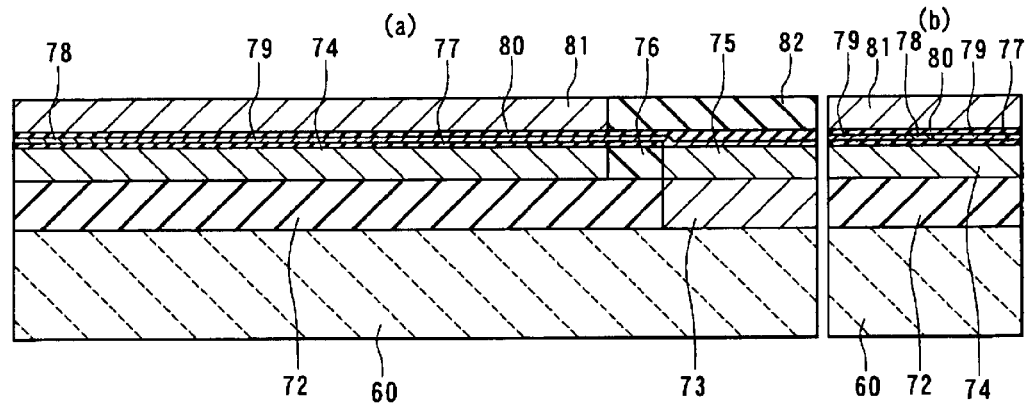
FIGS. 14A and 14B are sectional views for illustrating a step that follows FIGS. 13A and 13B.

Next, as shown in FIGS. 14A and 14B, a second shield layer 81 is formed on the second shield gap film 80. The second shield layer 81 is made of a magnetic material such as Permalloy (NiFe). The second shield layer 81 has a thickness of 2 μm, for example. The second shield layer 81 is opposed to the first shield layer 74. The MR element 78 is sandwiched between the first shield layer 74 and the second shield layer 81, and is shielded by those shield layers.

Then, an insulating layer 82 made of alumina, for example, is formed over the entire surface to a thickness of 3 μm, for example. The insulating layer 82 is then polished by CMP, for example, so that the second shield layer 81 is exposed, whereby the surface of the insulating layer 82 is flattened.

In this way, a plurality of reproducing head sections 22 each including the reproducing head 24 are formed on the one surface of the second wafer 60.

Figures 15A, 15B:
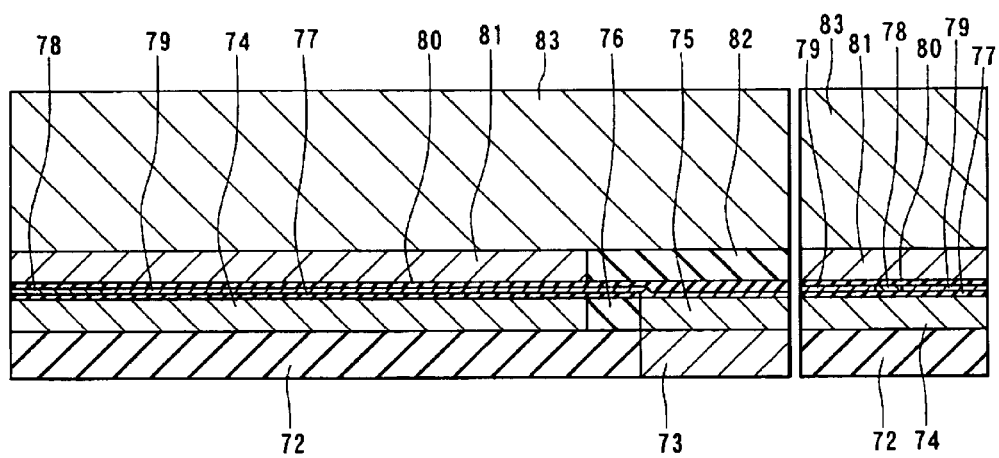
FIGS. 15A and 15B are sectional views for illustrating a step that follows FIGS. 14A and 14B.

Next, as shown in FIGS. 15A and 15B, a support plate 83 is placed on the plurality of reproducing head sections 22, and attached to the reproducing head sections 22. Then, the second wafer 60 is ground from the other surface (the bottom surface shown in FIGS. 14A and 14B) with a grinder, for example, to thereby remove at least part of the second wafer 60.

Figure 16:
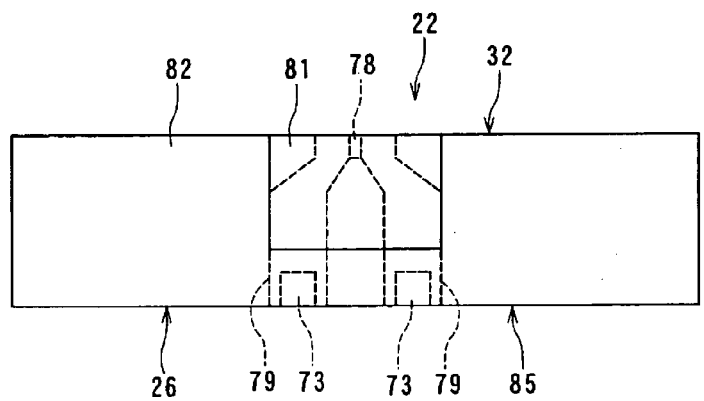
FIG. 16 is a top view of the reproducing head section of the embodiment of the invention.

In the manner as described above, the first reproducing head section aggregate 61A shown in FIG. 10 is fabricated. The first reproducing head section aggregate 61A is cut up at positions denoted by the reference numeral 62 in FIG. 10. This forms second reproducing head section aggregates each including a plurality of reproducing head sections 22 arranged in a row. FIG. 16 is a top view of the reproducing head section 22. As shown in FIG. 16, the reproducing head section 22 (the second reproducing head section aggregate) has two surfaces resulting from the cutting. The MR element 78 is exposed in one of the surfaces, and the conductors 73 are exposed in the other one of the surfaces. The one of the surfaces serves as the second medium facing surface 32. The other surface serves as a back surface 85 located on the opposite side from the second medium facing surface 32.

As shown in FIG. 16, the reproducing head section 22 has a body 26 that accommodates the reproducing head 24. The body 26 includes the second medium facing surface 32 and the back surface 85 located on the opposite side from the second medium facing surface 32. The body 26 corresponds to the reproducing head section body in the invention. The reproducing head 24 includes: the conductors 73 that are exposed in the back surface 85 and electrically connected to an external device; and the MR element 78 disposed near the second medium facing surface 32 and electrically connected to the conductors 73.

Figure 17:
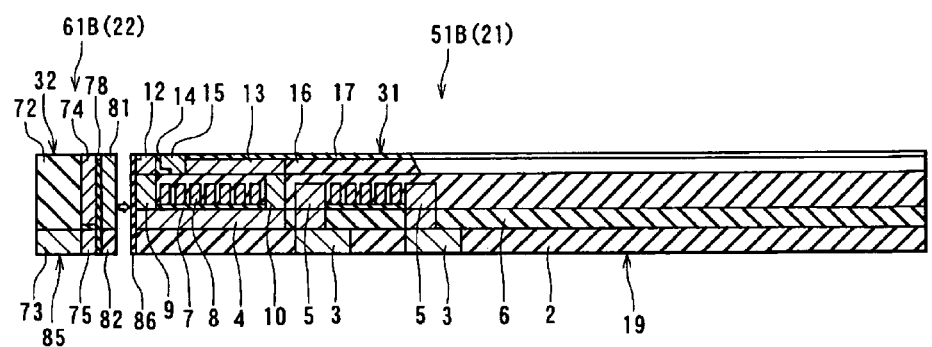
FIG. 17 is a sectional view for illustrating the step of bonding the slider section and the reproducing head section to each other in the embodiment of the invention.
Figure 18:
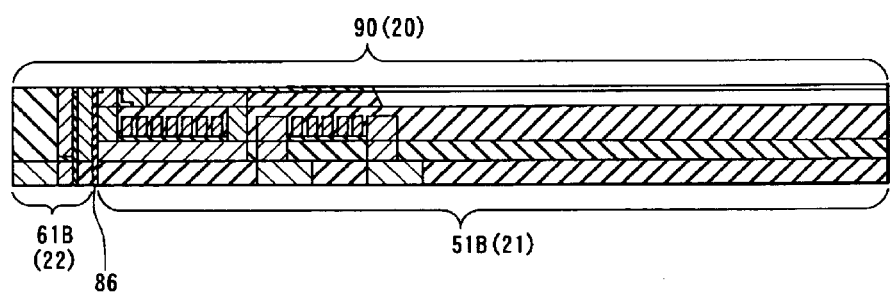
FIG. 18 is a sectional view for illustrating the step of bonding the slider section and the reproducing head section to each other in the embodiment of the invention.

The step of bonding the slider section 21 and the reproducing head section 22 to each other will now be described. In the step of bonding the slider section 21 and the reproducing head section 22 to each other, as shown in FIG. 17, the second slider section aggregate 51B including a plurality of slider sections 21 arranged in a row and the second reproducing head section aggregate 61B including a plurality of reproducing head sections 22 arranged in a row are bonded to each other with an adhesive 86, thereby fabricating a slider aggregate 90 including a plurality of sliders 20 arranged in a row, as shown in FIG. 18.

The surface of the slider section 21 to be bonded to the reproducing head section 22 is, of the two surfaces resulting from cutting the first slider section aggregate 51A at the positions indicated by reference numeral 52 in FIG. 3, the one closer to the recording head 23. Meanwhile, the surface of the reproducing head section 22 to be bonded to the slider section 21 is the surface opposite to the surface that results from the grinding in the step shown in FIGS. 15A and 15B.

A ceramic-based thermosetting adhesive, for example, is used as the adhesive 86 to bond the slider section 21 and the reproducing head section 22 to each other. Here, in order to prevent damage to some of the films making up the MR element 78 which are vulnerable to heat, the adhesive 86 is preferably heated at 300° C. or lower for curing so as to bond the slider section 21 and the reproducing head section 22 to each other.

Figure 19:
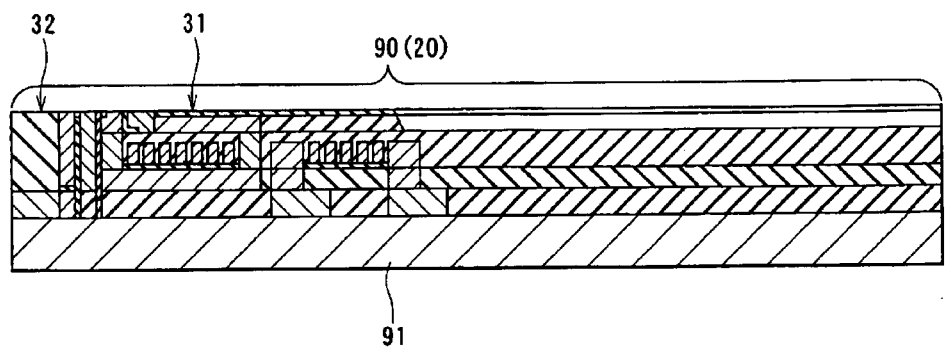
FIG. 19 is a sectional view for illustrating a step that follows FIG. 18.

The method of manufacturing the slider according to the embodiment includes, after bonding the slider section 21 and the reproducing head section 22 to each other as described above, the step of lapping the first and second medium facing surfaces 31 and 32 to flatten these surfaces 31 and 32. To perform the lapping, a support plate 91 is attached to the slider aggregate 90 including a plurality of sliders 20 arranged in a row, at the surface opposite from the first medium facing surfaces 31 and the second medium facing surfaces 32 as shown in FIG. 19, and the first and second medium facing surfaces 31 and 32 are brought into contact with the surface plate of a lapping apparatus. By lapping the first and second medium facing surfaces 31 and 32 in this way, it is possible to flatten the first and second medium facing surfaces 31 and 32 even if the slider section 21 and the reproducing head section 22 are bonded to each other with poor positioning precision.

The lapping of the slider aggregate 90 is performed while detecting the resistance values of the MR elements 78 in the plurality of reproducing head sections 22 included in the slider aggregate 90 so as to make every slider 20 equal in MR height and in throat height.

Figure 20:
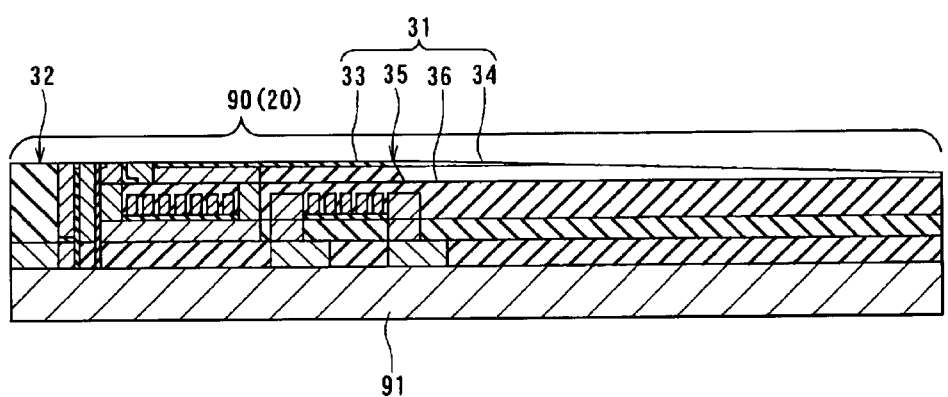
FIG. 20 is a sectional view for illustrating a step that follows FIG. 19.

Then, a step shown in FIG. 20 is performed. In this step, the slider aggregate 90 is lapped with its orientation with respect to the surface plate made different from that in the step of lapping the first and second medium facing surfaces 31 and 32, thereby lapping a part of each first medium facing surface 31. This provides each first medium facing surface 31 with the first surface 33, the second surface 34, and the border portion 35. As stated previously, the first surface 33 and the second surface 34 preferably form an angle in the range of 0.1° to 30°. Here, the angle formed between the first and second surfaces 33 and 34 shall fall within the range of 0.1 to 1.0°, for example, 0.5°.

Figure 21:
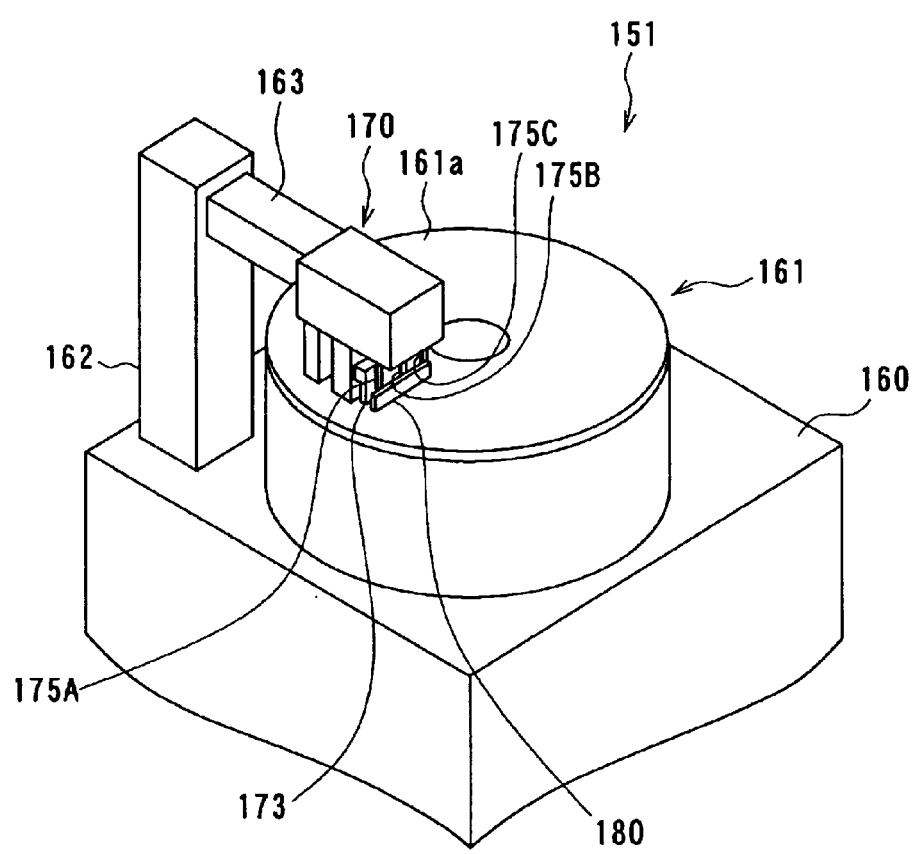
FIG. 21 is a perspective view showing a schematic configuration of a lapping apparatus for lapping a slider aggregate of the embodiment of the invention.
Figure 22:
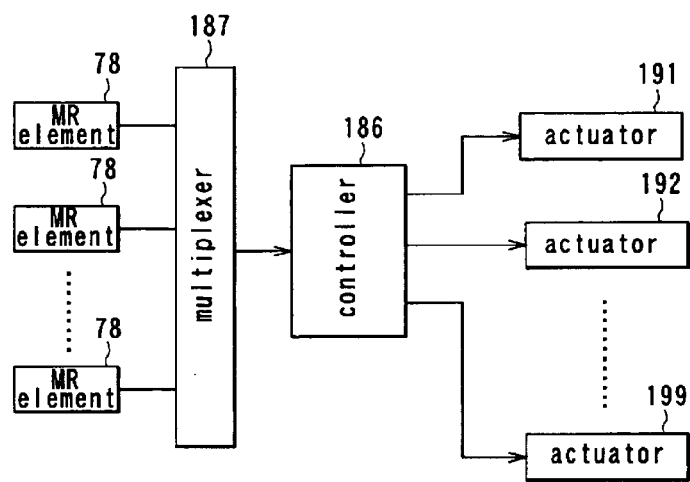
FIG. 22 is a block diagram showing an example of a circuit configuration of the lapping apparatus shown in FIG. 21.

Referring now to FIGS. 21 and 22, description will be given of an example of the method of lapping the slider aggregate 90 while detecting the resistance values of the MR elements 78 in the plurality of reproducing head sections 22 included in the slider aggregate 90 so as to make slider 20 equal in MR height and in throat height.

FIG. 21 is a perspective view illustrating a schematic configuration of a lapping apparatus for lapping the slider aggregate 90. This lapping apparatus 151 comprises: a table 160; a rotating lapping table 161 provided on the table 160; a strut 162 provided on the table 160 by the side of the rotating lapping table 161; and a material supporter 170 attached to the strut 162 through an arm 163. The rotating lapping table 161 has a lapping plate (surface plate) 161a to come to contact with the first and second medium facing surfaces 31 and 32 of the slider aggregate 90.

The material supporter 170 comprises a jig retainer 173 and three load application rods 175A, 175B and 175C placed in front of the jig retainer 173 with specific spacing. A jig 180 is to be fixed to the jig retainer 173. The jig 180 has three load application sections each of which is in the shape of a hole having an oblong cross section. Load application pins are provided at the lower ends of the load application rods 175A, 175B and 175C, respectively. Each of the load application pins has a head to be inserted to each of the load application sections (holes) of the jig 180, the head having an oblong cross section. Each of the load application pins is driven by an actuator (not shown) in the vertical, horizontal (along the length of the jig 180) and rotational directions.

The jig 180 has a retainer for retaining the slider aggregate 90. With this jig 180, the retainer and the slider aggregate 90 are deformed by applying loads in various directions to the three load application sections. The first and second medium facing surfaces 31 and 32 of the slider aggregate 90 are thereby lapped while the throat heights and MR heights of a plurality of sliders 20 in the slider aggregate 90 are controlled so that the target values are obtained.

FIG. 22 is a block diagram showing an example of the circuit configuration of the lapping apparatus shown in FIG. 21. This lapping apparatus comprises: nine actuators 191 to 199 for applying loads in the three directions to the load application sections of the jig 180; a controller 186 for controlling the nine actuators 191 to 199 through monitoring the resistance values of a plurality of MR elements 78 in the slider aggregate 90; and a multiplexer 187, connected to the MR elements 78 in the slider aggregate 90 through a connector (not shown), for selectively connecting one of the MR elements 78 to the controller 186.

In this lapping apparatus, the controller 186 monitors the resistance values of the MR elements 78 in the slider aggregate 90 through the multiplexer 187, and controls the actuators 191 to 199 so that throat height and MR height of every slider 20 in the slider aggregate 90 fall within a certain limited tolerance.

After lapping the first medium facing surfaces 31 in the step shown in FIG. 20, the slider aggregate 90 is cut into a plurality of sliders 20 separated from one another. The cutting of the slider aggregate 90 may be performed with the support plate 91 attached to the slider aggregate 90 or with the support plate 91 detached from the slider aggregate 90.

Figure 23:
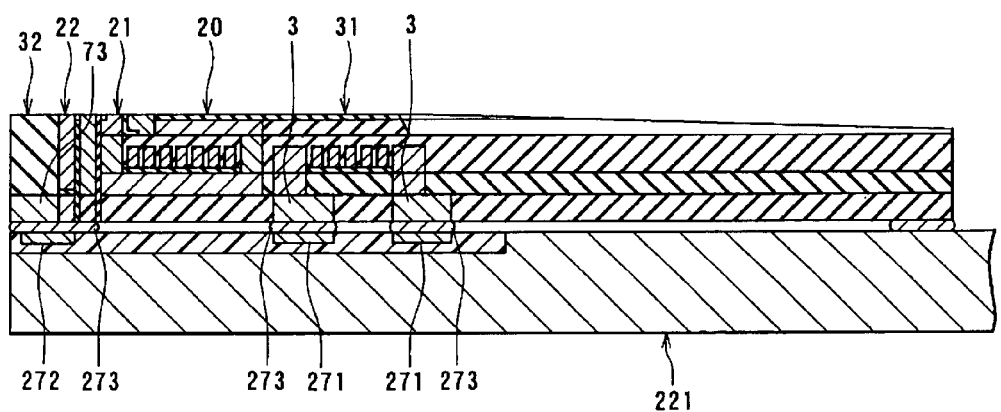
FIG. 23 is a sectional view for illustrating the step of mounting the slider of the embodiment of the invention onto a suspension.

Next, as shown in FIG. 23, each slider 20 is mounted on a suspension 221. The suspension 221 has two each of terminals 271 and 272. The terminals 271 are made of conductors and are opposed to the two conductors 3 of the slider 20, respectively. The terminals 272 are made of conductors and are opposed to the two conductors 73 of the slider 20, respectively. Leads (not shown) are connected at one end to the terminals 271 and 272, respectively. The other end of each lead is connected to an external device.

The conductors 3 and 73 of the slider 20 are electrically and mechanically connected to the terminals 271 and 272 of the suspension 221, respectively, with a conductive bonding agent 273 such as solder. The slider 20 and the suspension 221 are thereby mechanically bonded to each other. Thus, when bonding the slider 20 to the suspension 221 in the embodiment, the conductors 3 and 73 of the slider 20 are electrically connected to the terminals 271 and 272 of the suspension 221, respectively, at the same time. This eliminates the need to provide additional leads between the slider 20 and the suspension 221. As a result, it becomes possible to operate the recording head 23 and the reproducing head 24 at higher frequencies.

Figure 24:
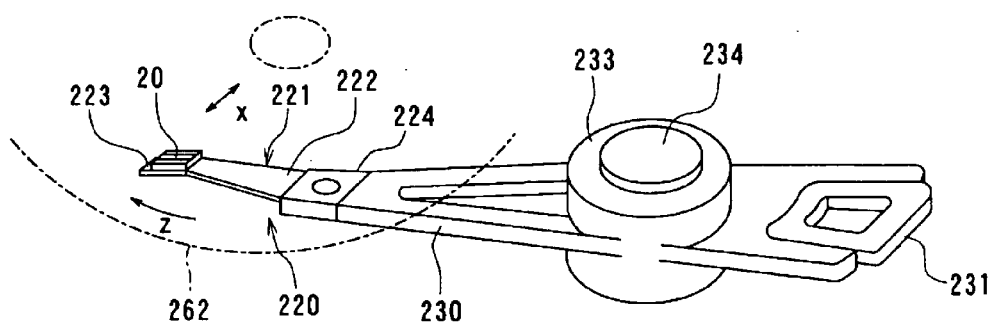
FIG. 24 is a perspective view of a head gimbal assembly incorporating the slider of the embodiment of the invention.
Figure 25:
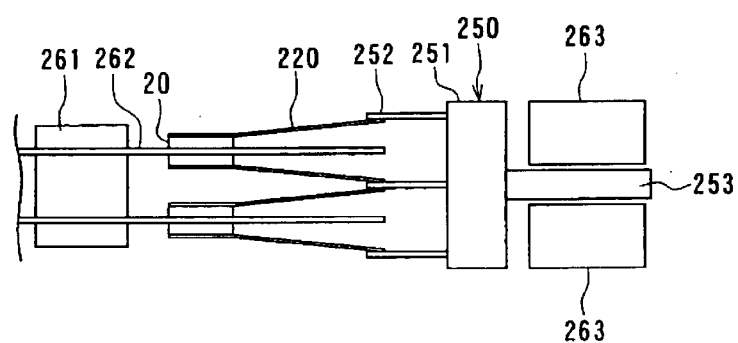
FIG. 25 is an explanatory view showing the main part of a hard disk drive in which the slider of the embodiment of the invention is used.
Figure 26:
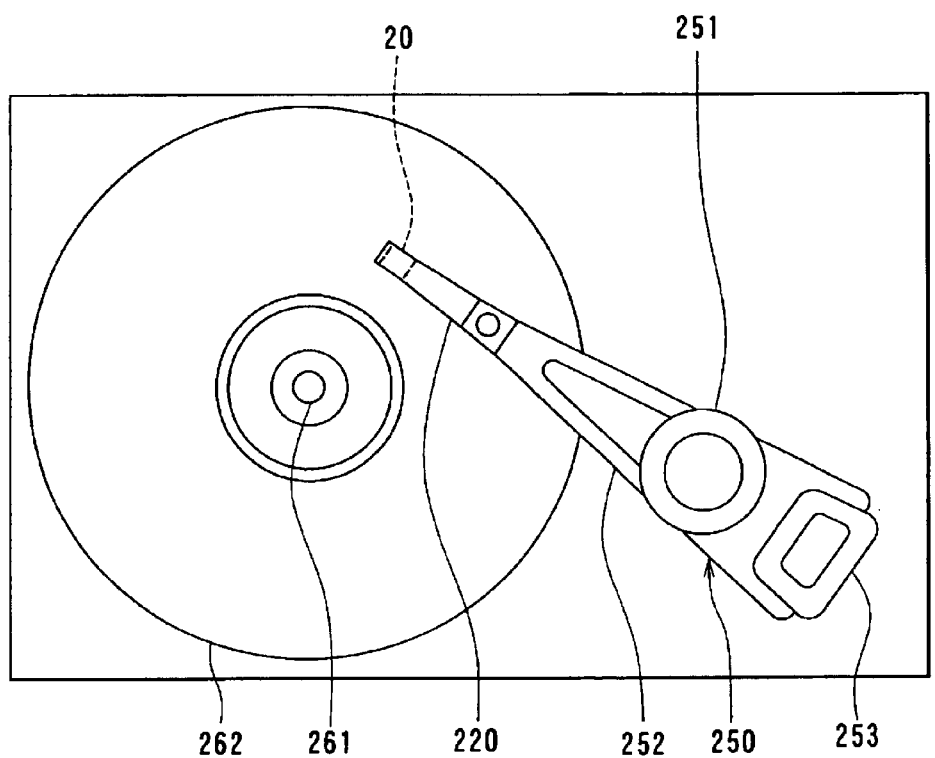
FIG. 26 is a top view of the hard disk drive in which the slider of the embodiment of the invention is used.

Reference is now made to FIGS. 24 to 26 to describe a head gimbal assembly and a hard disk drive incorporating the slider 20 of the present embodiment. Now, reference is made to FIG. 24 to describe the head gimbal assembly 220. In a hard disk drive, the slider 20 is disposed to face toward a hard disk platter 262 that is a circular-plate-shaped recording medium to be rotated and driven. The head gimbal assembly 220 comprises the slider 20 and the suspension 221 that flexibly supports the slider 20. The suspension 221 incorporates: a plate-spring-shaped load beam 222 made of stainless steel, for example; a flexure 223 to which the slider 20 is joined, the flexure being provided at an end of the load beam 222 and giving an appropriate degree of freedom to the slider 20; and a base plate 224 provided at the other end of the load beam 222. The base plate 224 is attached to an arm 230 of an actuator that moves the slider 20 along the x direction across the track of the hard disk platter 262. The actuator incorporates the arm 230 and a voice coil motor that drives the arm 230. A gimbal section that maintains the orientation of the slider 20 is provided in the portion of the flexure 223 on which the slider 20 is mounted.

The head gimbal assembly 220 is attached to the arm 230 of the actuator. An assembled body comprising the arm 230 and the head gimbal assembly 220 attached to the arm 230 is called a head arm assembly. An assembled body comprising a plurality of head gimbal assemblies 220 and a carriage with a plurality of arms is called a head stack assembly, in which the head gimbal assemblies 220 are each attached to the arms.

FIG. 24 illustrates an example of the head arm assembly. In the head arm assembly, the head gimbal assembly 220 is attached to an end of the arm 230. A coil 231 that is part of the voice coil motor is fixed to the other end of the arm 230. A bearing 233 is provided in the middle of the arm 230. The bearing 233 is attached to an axis 234 that rotatably supports the arm 230.

Reference is now made to FIGS. 25 and 26 to describe an example of the head stack assembly and the hard disk drive. FIG. 25 is an explanatory view illustrating the main part of the hard disk drive. FIG. 26 is a top view of the hard disk drive. The head stack assembly 250 incorporates a carriage 251 having a plurality of arms 252. A plurality of head gimbal assemblies 220 are each attached to the arms 252 such that the assemblies 220 are arranged in the vertical direction with spacing between adjacent ones. A coil 253 that is part of the voice coil motor is mounted on the carriage 251 on a side opposite to the arms 252. The head stack assembly 250 is installed in the hard disk drive. The hard disk drive includes a plurality of hard disk platters 262 mounted on a spindle motor 261. Two of the sliders 20 are allocated to each of the platters 262, such that the two sliders 20 face each other with each of the platters 262 in between. The voice coil motor includes permanent magnets 263 located to face each other, the coil 253 of the head stack assembly 250 being placed between the magnets 263.

The head stack assembly 250 except the slider 20 and the actuator support the slider 20 and align it with respect to the hard disk platter 262.

In this hard disk drive, the actuator moves the slider 20 across the track of the platter 262 and aligns the slider 20 with respect to the platter 262. The thin-film magnetic head incorporated in the slider 20 writes data on the platter 262 through the use of the recording head and reads data stored on the platter 262 through the use of the reproducing head.

Figure 27:
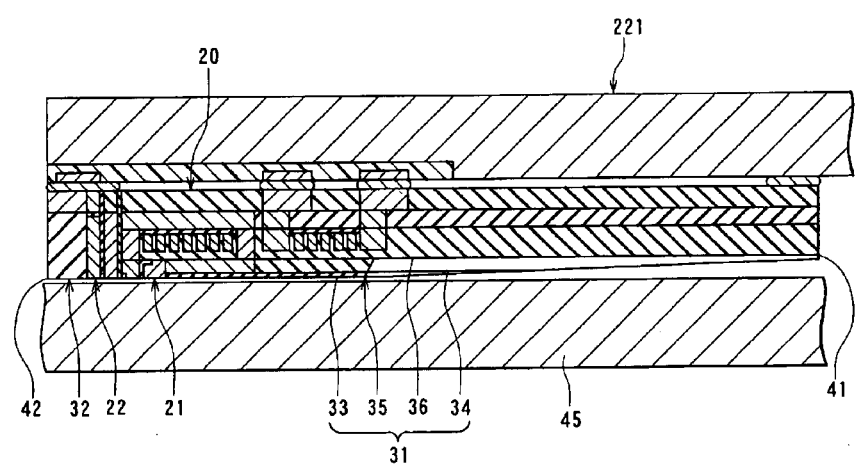
FIG. 27 is a sectional view showing a state of the slider of the embodiment of the invention while the recording medium is rotating.
Figure 28:
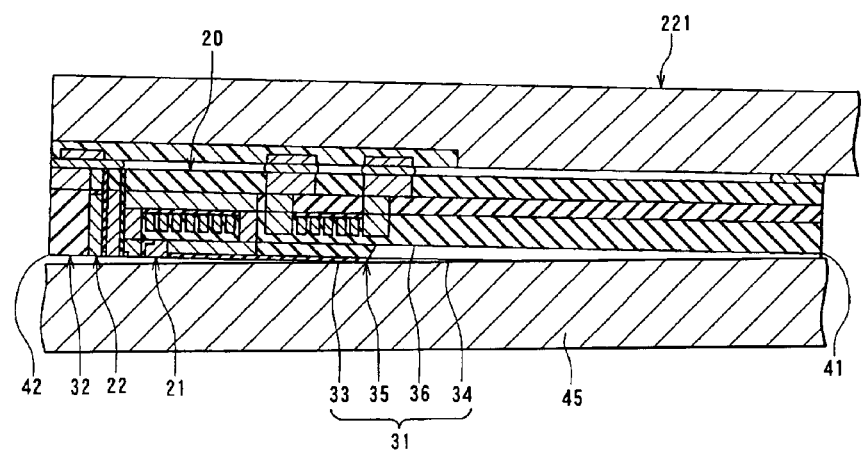
FIG. 28 is a sectional view showing a state of the slider of the embodiment of the invention while the recording medium is at rest.

Reference is now made to FIGS. 27 and 28 to describe the functions of the slider 20 according to the embodiment. FIG. 27 is a sectional view showing a state of the slider 20 while the recording medium 45 is rotating. FIG. 28 is a sectional view showing a state of the slider 20 while the recording medium 45 is at rest.

As shown in FIG. 27, while the recording medium 45 is rotating, the slider section 21 flies by means of the airflow created by the rotation of the recording medium 45 and is off the surface of the recording medium 45. In FIG. 27, the recording medium 45 travels to the left. On the other hand, as shown in FIG. 28, the slider section 21 is in contact with the surface of the recording medium 45 while the recording medium 45 is at rest.

As shown in FIG. 27, while the recording medium 45 is rotating, the second surface 34 of the first medium facing surface 31 slants with respect to the surface of the recording medium 45 such that the smaller the distance between a point in the second surface 34 and the border portion 35, the smaller the distance between the point in the second surface 34 and the recording medium 45. While the recording medium 45 is rotating, the first surface 33 of the first medium facing surface 31 and the second medium facing surface 32 are almost parallel to the surface of the recording medium 45. While the recording medium 45 is rotating, the second surface 34 preferably forms an angle of 30° or smaller, and more preferably an angle of 10° or smaller, with respect to the surface of the recording medium 45. It is also preferable that the angle that the second surface 34 forms with the surface of the recording medium 45 is not smaller than 0.1°. The angle that the second surface 34 forms with the surface of the recording medium 45 while the recording medium 45 is rotating can be controlled according to the shape of the concavities and convexities of the first medium facing surface 31.

As described in the foregoing, according to the embodiment, the slider section 21 and the reproducing head section 22 are fabricated separately, and then bonded to each other to complete the slider 20. Therefore, according to the embodiment, it is possible to fabricate the slider section 21 and the reproducing head section 22 in large lots at a time separately. In particular, it is possible to prepare at a time a large number of the recording heads 23 and the first medium facing surfaces 31 on the first wafer 50. According to the conventional method of manufacturing a slider, a wafer having a plurality of thin-film magnetic head elements formed thereon is cut into a plurality of bars. Each bar is then lapped to form a lapped surface, and the lapped surface of each bar is etched to form medium facing surfaces. According to the slider 20 of the embodiment and the manufacturing method thereof, it is possible to significantly reduce the number of steps for manufacturing the slider, as compared with the case of the conventional slider and the manufacturing method thereof. The manufacturing cost of the slider 20 is thereby significantly reduced.

In the embodiment, in each of a number of the slider sections 21 formed on the first wafer 50, the first and second pole portion layers 12 and 15 are exposed in the surface to be the first medium facing surface 31. Then, the pole portion layers 12 and 15 exposed in this surface are etched to form the protrusions for the layers 12 and 15, for defining the recording track. Consequently, according to the embodiment, it becomes possible to define a minute recording track width with precision.

In the embodiment, the thin-film coil 8 is disposed near the first medium facing surface 31, in almost parallel to the first medium facing surface 31. Therefore, it is possible to cool the thin-film coil 8 efficiently. As a result, according to the embodiment, the pole portions can be prevented from protruding toward the recording medium due to heat caused by the thin-film coil 8. This allows a reduction in magnetic space.

According to the embodiment, while the recording medium 45 is rotating, a pressure for moving the slider section 21 away from the recording medium 45 is generated between the recording medium 45 and the second surface 34. In the embodiment, the difference in level between the second and third surfaces 34 and 36 varies gradually so as to increase with decreasing distance from the reproducing head section 22. Therefore, during the rotation of the recording medium 45, the air passing through between the third surface 36 and the recording medium 45 gradually increases in volume. Consequently, a negative pressure for drawing the slider section 21 toward the recording medium 45 is generated between the third surface 36 and the recording medium 45. This negative pressure allows a part of the slider section 21 located near the reproducing head section 22, in particular, to be close to the recording medium 45 while the medium is rotating. Consequently, according to the slider 20 of the embodiment, a reduction in magnetic space is achieved. In terms of reduction in magnetic space, by appropriately designing the shape of the concavities and convexities of the first medium facing surface 31, it is possible for the slider 20 of the embodiment to work equivalently or better than the slider 120 shown in FIG. 38 whose medium facing surface has three surfaces of different levels.

Figure 38:
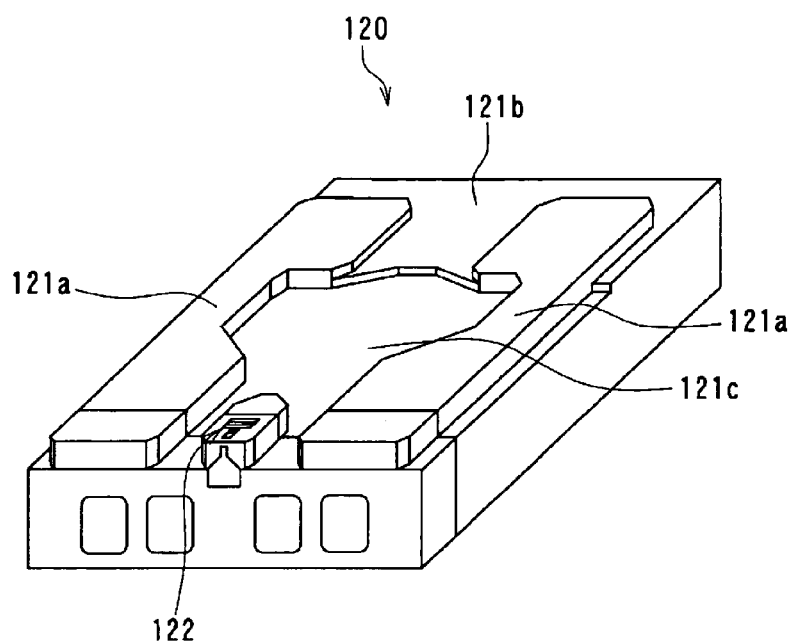
FIG. 38 is a perspective view of the related-art slider.
Figure 39:
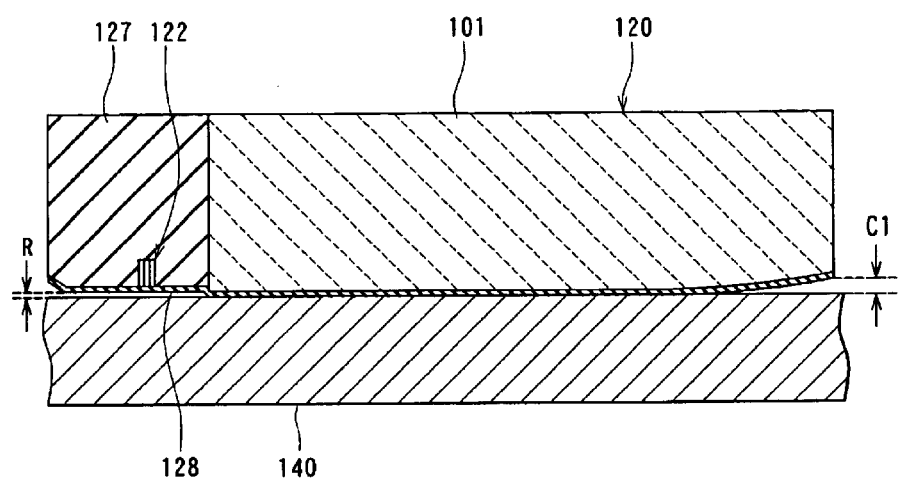
FIG. 39 is a sectional view illustrating the related-art slider and a recording medium where the recording medium is at rest.
Figure 40:
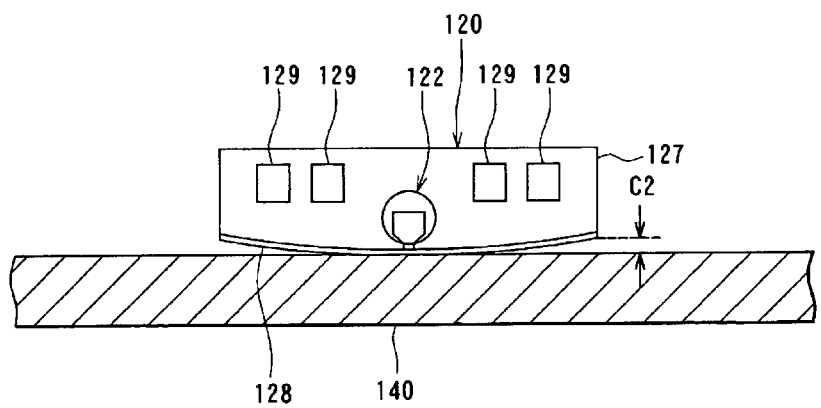
FIG. 40 is a front view of the related-art slider as viewed from the upper side of FIG. 37.
Figure 41:
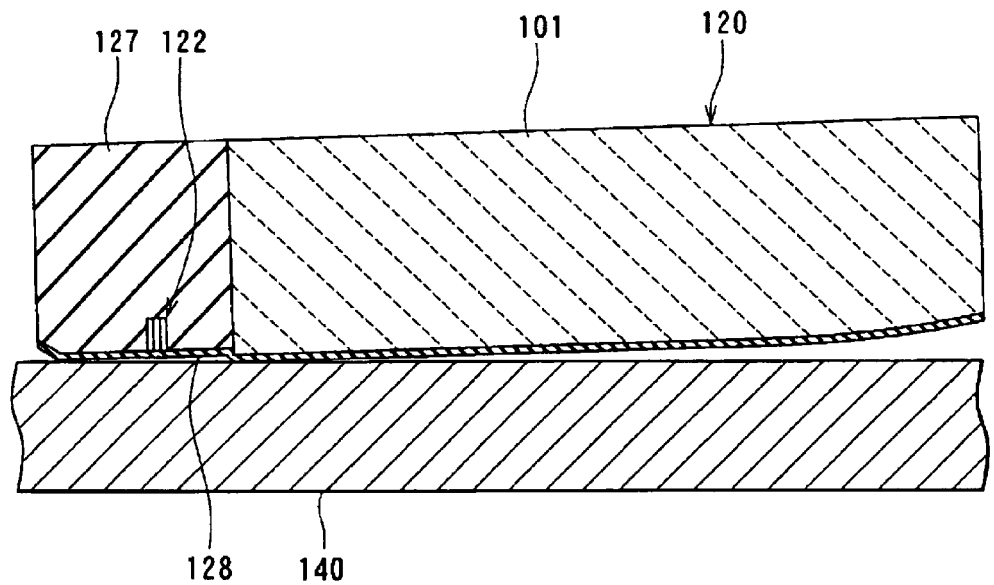
FIG. 41 is a sectional view illustrating the related-art slider and the recording medium where the recording medium has just started rotation from a resting state.
Figure 42:
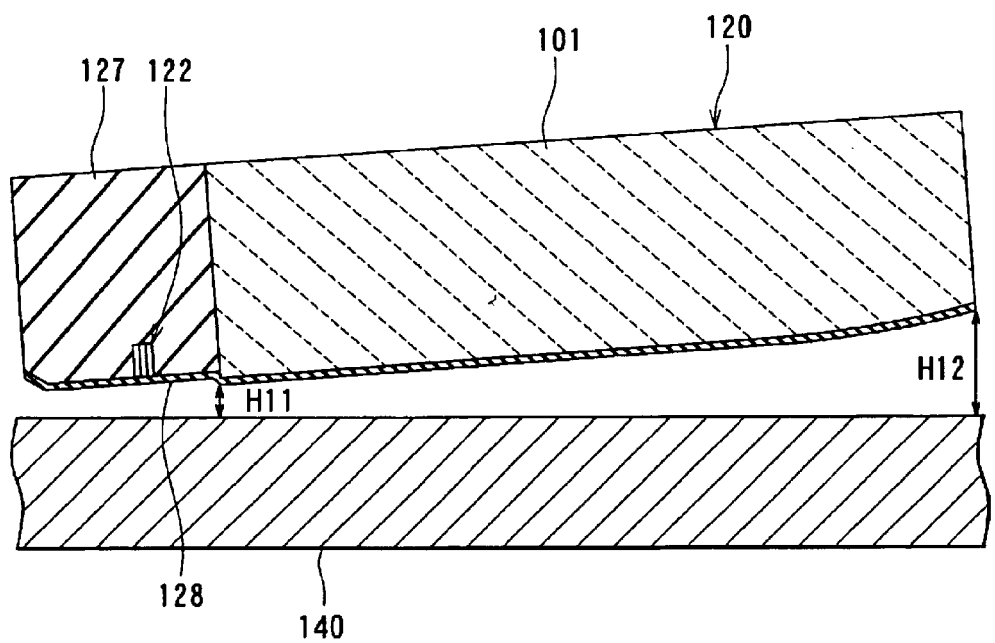
FIG. 42 is a sectional view illustrating the related-art slider flying over the surface of the recording medium.

For such a medium facing surface as has three surfaces of different levels as shown in FIG. 38, negative pressure is generated by the surfaces 121b and 121c whose levels are different from each other. In contrast, according to the embodiment, negative pressure is generated by the third surface 36 having no step. Therefore, air flows more smoothly through between the slider 20 and the recording medium 45 as compared with the case of the slider 120 shown in FIG. 38. According to the embodiment, it is thus easy to control the orientation of the slider 20 during the rotation of the recording medium 45.

In the embodiment, when the recording medium 45 shifts from the rotating state to the resting state and the slider section 21 comes into contact with the surface of the recording medium 45, the border portion 35 is the first to make contact with the surface of the recording medium 45. When the recording medium 45 shifts from the resting state to the rotating state and the slider section 21 takes off from the surface of the recording medium 45, the border portion 35 is the last to depart from the surface of the recording medium 45. Thus, the border portion 35 functions like a wheel of an aircraft.

As described above, the slider 20 of the embodiment makes contact with the surface of the recording medium 45 at the border portion 35 of the slider section 21. Therefore, as compared with conventional sliders, the area of the slider section 21 contacting the surface of the recording medium 45 is extremely smaller, yielding an extreme reduction in the frictional resistance between the slider section 21 and the surface of the recording medium 45. Therefore, according to the slider 20 of the embodiment, the initial contact of the slider section 21 with the surface of the recording medium 45 and the separation of the slider section 21 from the surface of the recording medium 45 can be performed smoothly. As a result, it is possible to prevent occurrence of damage to the recording medium 45 and the thin-film magnetic head due to a collision between the slider 20 and the recording medium 45.

In the slider 20 of the embodiment, the area of the slider section 21 contacting the surface of the recording medium 45 when it is at rest is extremely smaller than in conventional sliders. It is therefore possible to prevent the slider 20 from sticking to the recording medium 45.

According to the slider 20 of the embodiment, as shown in FIG. 27, during the rotation of the recording medium 45 the second surface 34 of the first medium facing surface 31 slants with respect to the surface of the recording medium 45 such that the smaller the distance between a point in the second surface 34 and the air inflow end 41, the greater the distance between the point in the second surface 34 and the recording medium 45. As a result, the recording head 23 and the reproducing head 24 get closer to the surface of the recording medium 45. Thus, according to the slider 20 of the embodiment, during the rotation of the recording medium 45, the recording head 23 and the reproducing head 24 are allowed to be close to the surface of the recording medium 45 while the second surface 34 is kept farther from the recording medium 45 than the recording head 23 and the reproducing head 24. Therefore, the embodiment makes it possible to attain a greater reduction in magnetic space while avoiding a collision between the slider 20 and the recording medium 45.

As has been described, the slider 20 of the embodiment makes it possible to reduce the magnetic space. Furthermore, it is possible to prevent the slider 20 from sticking to the recording medium 45, and to prevent damage to the recording medium 45, the recording head 23 or the reproducing head 24 due to a collision between the slider 20 and the recording medium 45.

According to the embodiment, as a result of reduction in the magnetic space, it is possible to improve the overwrite property and nonlinear transition shift of the recording head 23. Furthermore, as a result of reduction in the magnetic space, it is possible to improve the reproducing output and reduce the half width of the reproducing head 24, thereby allowing an increase in the recording density.

The embodiment thus makes it possible to improve the characteristics of both the recording head 23 and the reproducing head 24. As a result, it is possible to improve the yield of hard disk drives that implement the slider 20 of the embodiment.

To form the medium facing surface having three surfaces of different levels as shown in FIG. 38, two steps of forming an etching mask and two etching steps are required. In contrast, the embodiment involves only a single step of forming an etching mask and a single step of etching. Instead, the embodiment requires an extra step of lapping the first medium facing surface 31 as compared to the case of forming the medium facing surface shown in FIG. 38. However, the step of lapping the first medium facing surface 31 is simpler than the steps of forming an etching mask and performing etching. Thus, according to the embodiment, the process for forming the first medium facing surface 31 is simpler than that for forming the medium facing surface shown in FIG. 38. The manufacturing cost of the slider 20 is therefore reduced.

In the embodiment, the first medium facing surface 31 is formed easier than in the cases where crowns or cambers are formed on the medium facing surfaces of sliders. Besides, there will occur no problem associated with the crown/camber formation. Thus, according to the embodiment, it is possible to precisely define the shape of the first medium facing surface 31, improve the yield of the slider 20 and reduce the manufacturing costs of the slider 20, as compared to the cases where crowns or cambers are formed on the medium facing surfaces of sliders. In view of the foregoing, the embodiment of the invention is excellent in terms of mass productivity.

In the embodiment, in the first medium facing surface 31, the length from the border portion 35 to the end of the medium facing surface 31 closer to the reproducing head section 22 is preferably 50% or less of the length from the end thereof closer to the reproducing head section 22 to the air inflow end 41. If this is satisfied, during rotation of the recording medium 45, the length of the portion (the portion extending from the border portion 35 to the end of the first medium facing surface 31 closer to the reproducing head section 22) that approaches the surface of the recording medium 45 out of the entire slider section 21 becomes equal to or less than the length of the portion (the second surface 34) that gets away from the surface of the recording medium 45. It is thereby possible to prevent a collision between the slider 20 and the recording medium 45 with yet higher reliability.

Meanwhile, according to the embodiment, the slider section 21 and the reproducing head section 22 are bonded to each other to form the slider 20. Therefore, the joint between the slider section 21 and the reproducing head section 22 in the slider 20 is inferior to the other portions in terms of strength. Accordingly, in order to prevent breakage of the slider 20, it is preferable that no external force be applied to the joint between the slider section 21 and the reproducing head section 22. The slider 20 according to the embodiment contacts the surface of the recording medium 45 at the border portion 35. Therefore, the joint between the slider section 21 and the reproducing head section 22 does not contact the surface of the recording medium 45. As a result, it is possible to prevent breakage of the slider 20 which could be caused by an external force applied by the recording medium to the joint between the slider section 21 and the reproducing head section 22.

Figure 29:
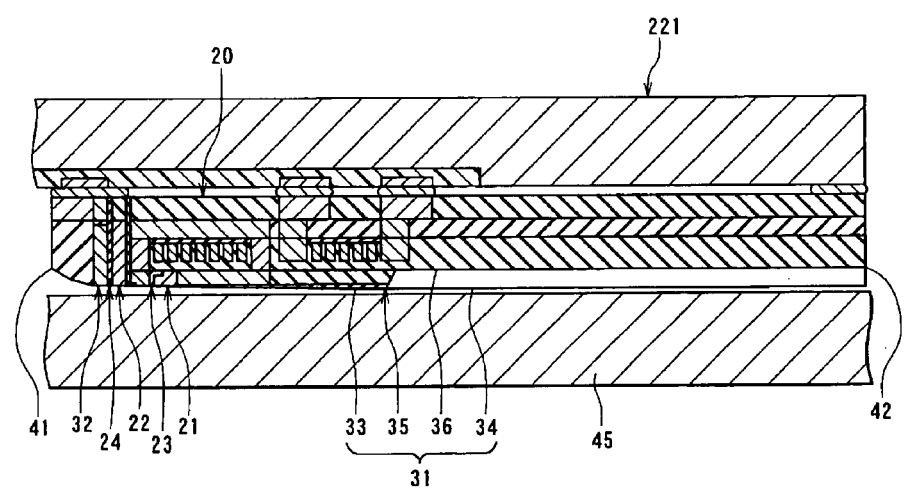
FIG. 29 is a sectional view of a slider of a first modified example of the embodiment of the invention.
Figure 30:
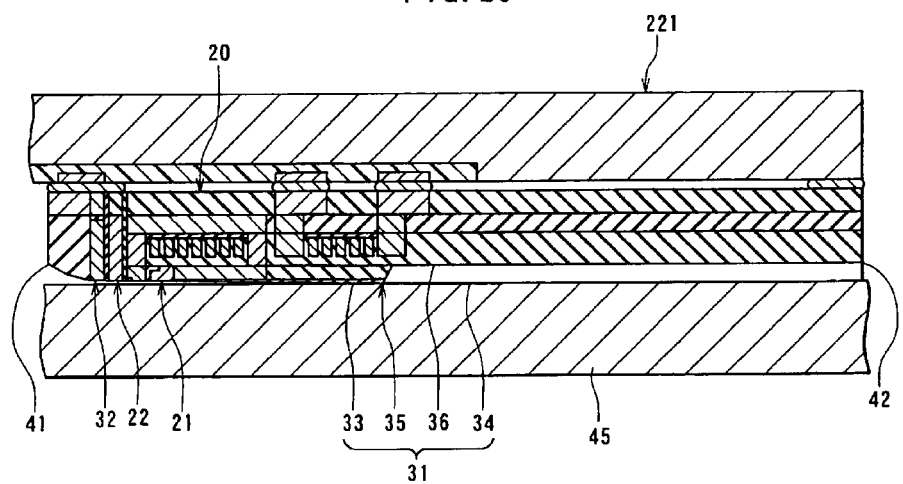
FIG. 30 is a sectional view of the slider of the first modified example of the embodiment of the invention.

Hereinafter, description will be given of three modified examples of the slider 20 according to the embodiment. FIGS. 29 and 30 show the slider 20 according to a first modified example. FIG. 29 is a sectional view of the slider 20 while the recording medium 45 is rotating. FIG. 30 is a sectional view of the slider 20 while the recording medium 45 is at rest. In the slider 20 of the first modified example, the end of the second medium facing surface 32 of the reproducing head section 22 farther from the slider section 21 makes the air inflow end 41. The end of the first medium facing surface 31 of the slider section 21 farther from the reproducing head section 22 makes the air outflow end 42.

In the slider 20 of the first modified example, the second surface 34 of the first medium facing surface 31 is parallel to the third surface 36 and to the surface of the slider section 21 opposite from the first medium facing surface 31. In the first modified example, the first surface 33 is slanted with respect to the second surface 34 such that the first and second surfaces 33 and 34 make a convex shape (roof-like shape) bent at the border portion 35. The first and second surfaces 33 and 34 preferably form an angle of 30° or smaller, and more preferably an angle of 10° or smaller. It is also preferable that the angle formed between the first and second surfaces 33 and 34 does not fall below 0.1°.

In the slider 20 of the first modified example, the second medium facing surface 32 is formed to be continuous to the first surface 33 of the first medium facing surface 31. Besides, the second medium facing surface 32 is curved such that the smaller the distance between a point in the second medium facing surface 32 and the air inflow end 41, the greater the distance between the point in the second medium facing surface 32 and the recording medium 45.

In the slider 20 of the first modified example, as shown in FIG. 29, the slider section 21, while the recording medium 45 is rotating, flies by means of the airflow created by the rotation of the recording medium 45 and is off the surface of the recording medium 45. In FIG. 29, the recording medium 45 travels to the right. While the recording medium 45 is rotating, the distance between the reproducing head 24 and the surface of the recording medium 45 is 5 to 8 nm, for example. On the other hand, as shown in FIG. 30, the slider section 21 is in contact with the surface of the recording medium 45 while the recording medium 45 is at rest.

In the slider 20 of the first modified example, when the recording medium 45 shifts from the rotating state to the resting state and the slider section 21 comes into contact with the surface of the recording medium 45, the border portion 35 is the first to make contact with the surface of the recording medium 45. When the recording medium 45 shifts from the resting state to the rotating state and the slider section 21 takes off from the surface of the recording medium 45, the border portion 35 is the last to depart from the surface of the recording medium 45.

The method of manufacturing the slider 20 of the first modified example does not include the step of lapping part of the first medium facing surface 31 to form the second surface 34 as shown in FIG. 20. Instead, part of the first medium facing surface 31 and the second medium facing surface 32 are lapped to determine the shapes of the first surface 33 of the first medium facing surface 31 and the second medium facing surface 32.

The remainder of the configuration of the slider 20 of the first modified example and the remainder of the steps of the manufacturing method therefor are the same as those of the slider 20 shown in FIGS. 1 and 2.

Figure 31:
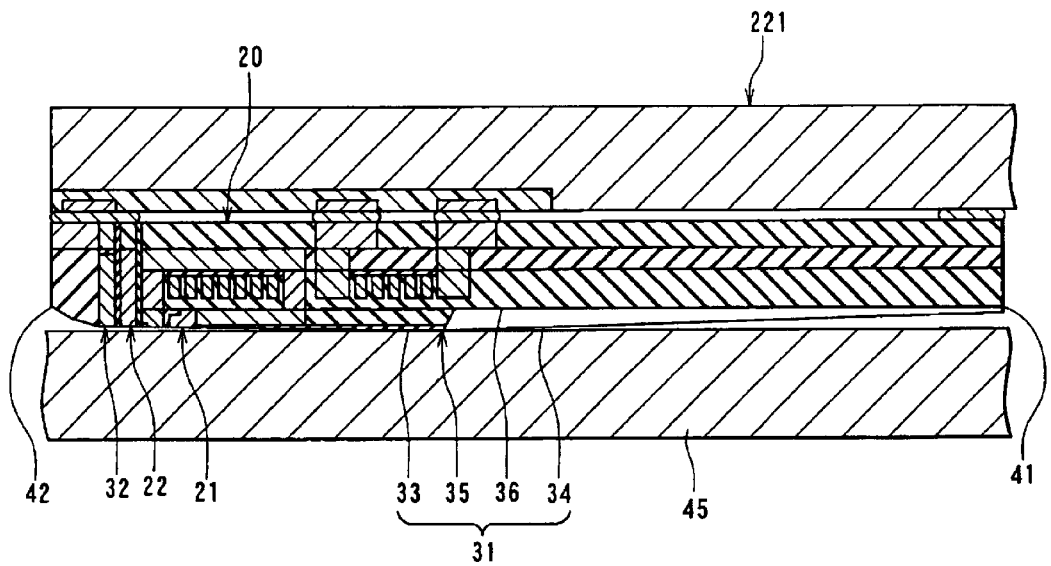
FIG. 31 is a sectional view of a slider of a second modified example of the embodiment of the invention.

FIG. 31 is a sectional view of the slider 20 according to a second modified example. In the slider 20 of the second modified example, the end of the first medium facing surface 31 of the slider section 21 farther from the reproducing head section 22 makes the air inflow end 41. The end of the second medium facing surface 32 of the reproducing head section 22 farther from the slider section 21 makes the air outflow end 42.

In the slider 20 of the second modified example, the second surface 34 of the first medium facing surface 31 is slanted with respect to the third surface 36 as in the slider 20 shown in FIGS. 1 and 2. In the slider 20 of the second modified example, the first surface 33 of the first medium facing surface 31 is slanted with respect to the third surface 36 as in the first modified example. As a result, the first and second surfaces 33 and 34 are slanted with respect to each other such that the first and second surfaces 33 and 34 make a convex shape (roof-like shape) bent at the border portion 35. The first and second surfaces 33 and 34 preferably form an angle of 30° or smaller, and more preferably an angle of 10° or smaller. It is also preferable that the angle formed between the first and second surfaces 33 and 34 does not fall below 0.1°.

In the slider 20 of the second modified example, as in the first modified example, the second medium facing surface 32 is formed to be continuous to the first surface 33 of the first medium facing surface 31. The second medium facing surface 32 is also curved such that the smaller the distance between a point in the second medium facing surface 32 and the air inflow end 41, the greater the distance between the point in the second medium facing surface 32 and the recording medium 45.

As shown in FIG. 31, in the slider 20 of the second modified example, the slider section 21 is in contact with the surface of the recording medium 45 at the border portion 35 regardless of whether the recording medium 45 is rotating or at rest. While the recording medium 45 is rotating, the second surface 34 of the first medium facing surface 31 slants with respect to the surface of the recording medium 45 such that the smaller the distance between a point in the second surface 34 and the air inflow end 41, the greater the distance between the point in the second surface 34 and the recording medium 45. While the recording medium 45 is rotating, the first surface 33 of the first medium facing surface 31 and the second medium facing surface 32 slant with respect to the surface of the recording medium 45 such that the smaller the distance from the air outflow end 42 to a point in the first surface 33 of the first medium facing surface 31 and in the second medium facing surface 32, the greater the distance from that point to the recording medium 45. While the recording medium 45 is at rest, either the first surface 33 or the second surface 34 of the first medium facing surface 31 may be in contact with the surface of the recording medium 45.

Since the slider 20 of the second modified example is in contact with the surface of the recording medium 45 even while the recording medium 45 is rotating, a greater reduction in magnetic space is achieved. Furthermore, according to the slider 20 of the second modified example, since the slider section 21 is always in contact with the surface of the recording medium 45, it is possible to prevent occurrence of a collision between the slider section 21 and the recording medium 45 which could be caused by the slider section 21 coming into contact with and getting away from the surface of the recording medium 45.

In the method of manufacturing the slider 20 of the second modified example, part of the first medium facing surface 31 is lapped to form the second surface 34 in the step shown in FIG. 20. Then, another part of the first medium facing surface 31 and the second medium facing surface 32 are lapped to determine the shapes of the first surface 33 and the second medium facing surface 32.

The remainder of the configuration of the slider 20 of the second modified example and the remainder of the steps of the manufacturing method therefor are the same as those of the slider 20 shown in FIGS. 1 and 2 or the slider 20 of the first modified example.

Figure 32:
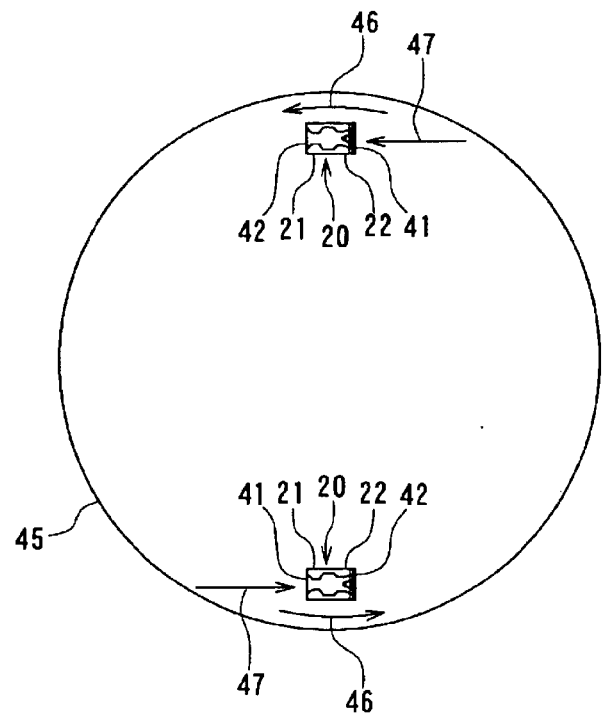
FIG. 32 is an explanatory view for illustrating the positional relationship between the slider and the recording medium.

Reference is now made to FIG. 32 to describe the positional relationship between the slider 20 and the recording medium 45. In FIG. 32, the arrows designated by the reference numeral 46 indicate the direction of rotation of the recording medium 45. The arrows designated by the reference numeral 47 indicate the directions of airflow. The slider 20 shown in FIGS. 1 and 2 and the slider 20 of the second modified example are placed like the slider 20 shown on the lower side of FIG. 32. That is, this slider 20 is placed such that the slider section 21 is located on the upstream side of the airflow and the reproducing head section 22 is located on the downstream side of the airflow. In contrast, the slider 20 of the first modified example is placed like the slider 20 shown on the upper side of FIG. 32. That is, this slider 20 is placed such that the reproducing head section 22 is located on the upstream side of the airflow and the slider section 21 is located on the downstream side of the airflow.

Figure 33:
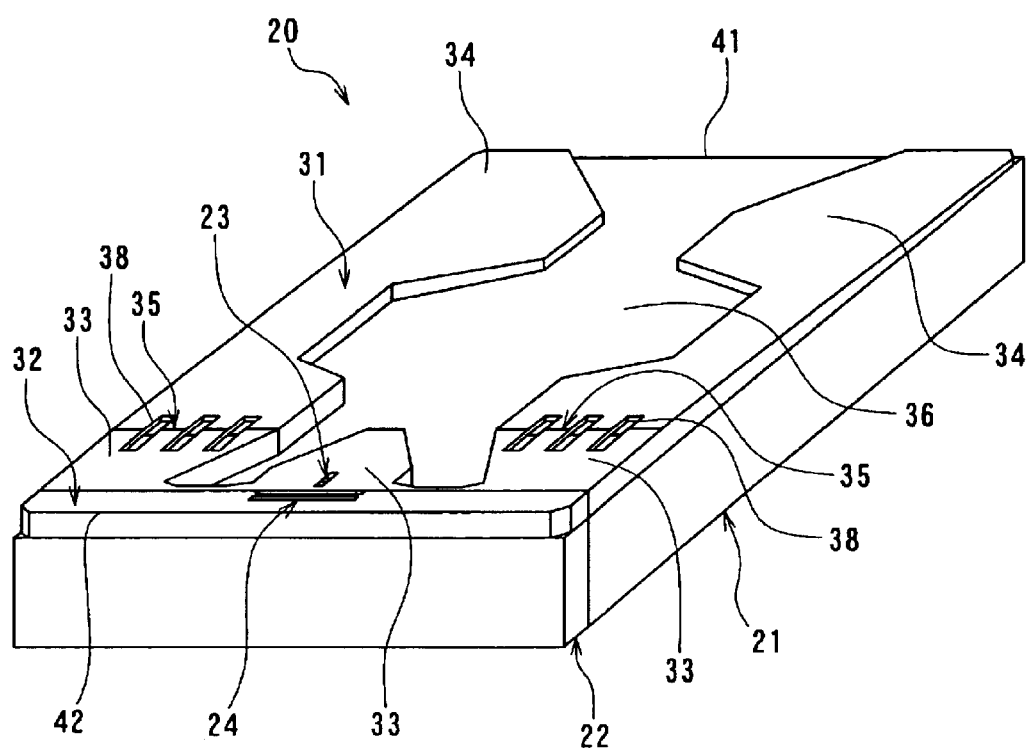
FIG. 33 is a perspective view of a slider of a third modified example of the embodiment of the invention.
Figure 34:
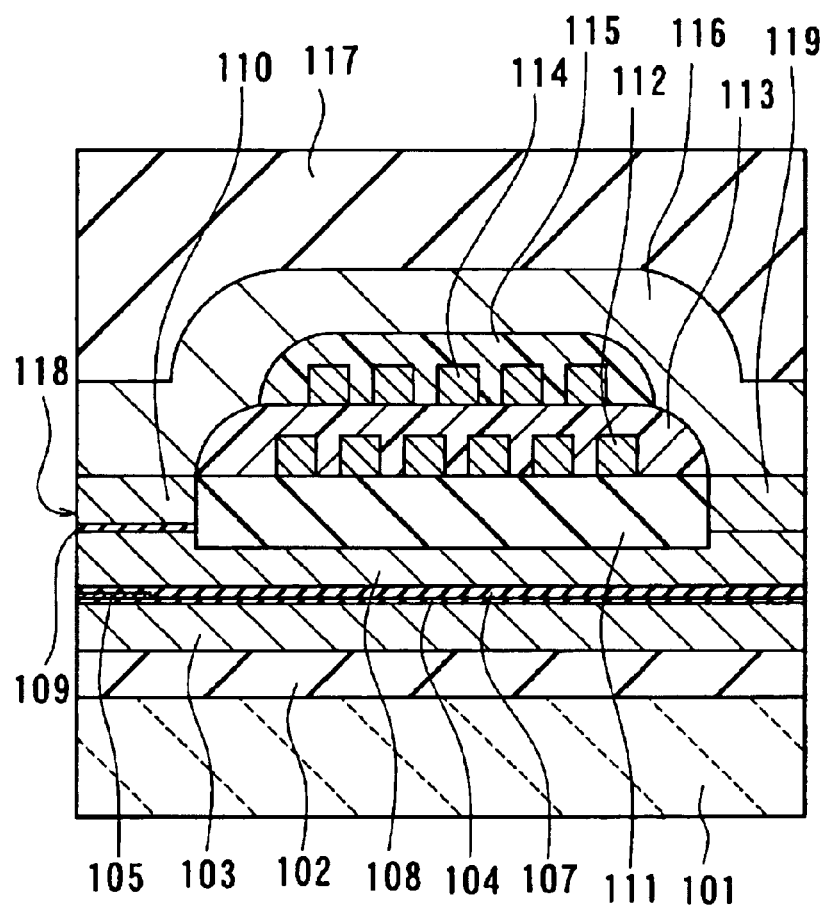
FIG. 34 is a sectional view of a thin-film magnetic head element of related art.
Figure 35:
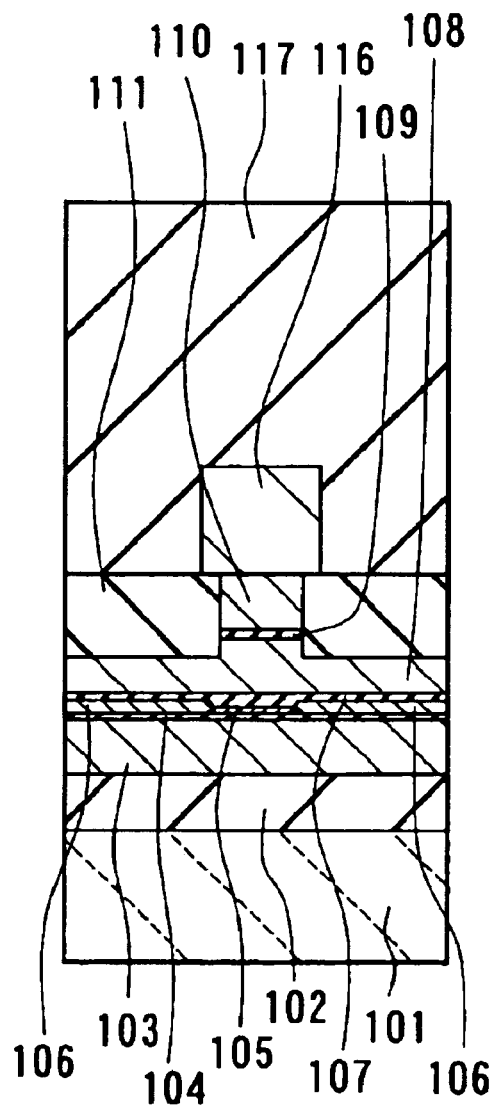
FIG. 35 is a sectional view of the thin-film magnetic head element of the related art.
Figure 36:
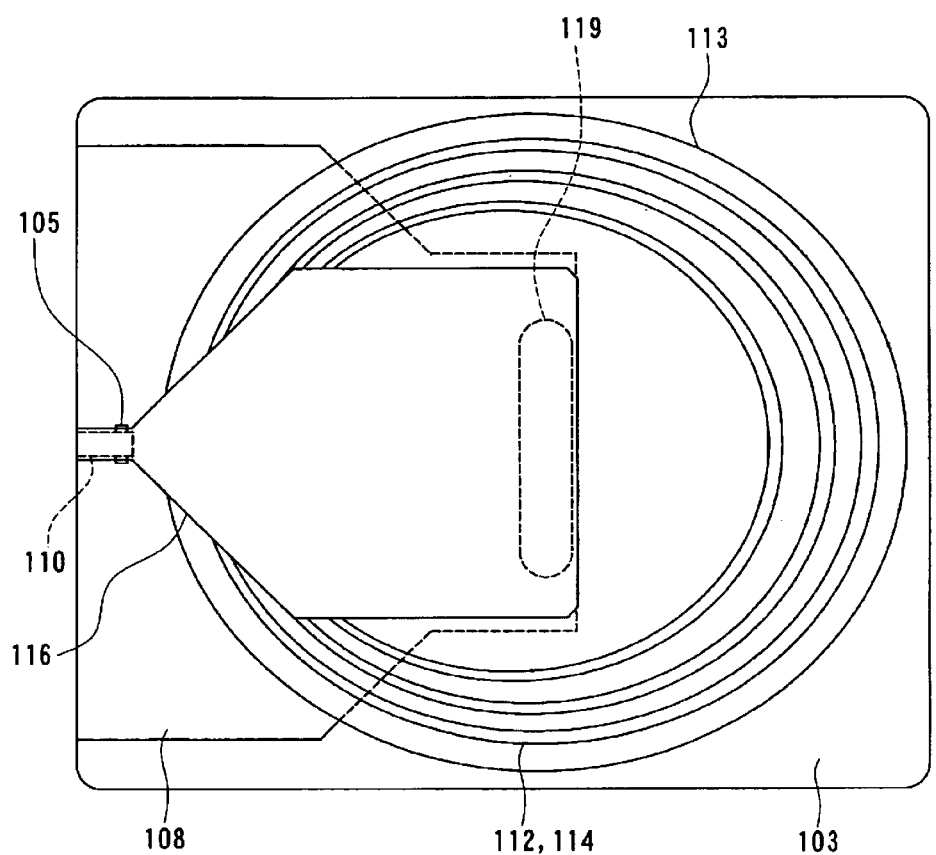
FIG. 36 is a top view of the thin-film magnetic head element of the related art.
Figure 37:
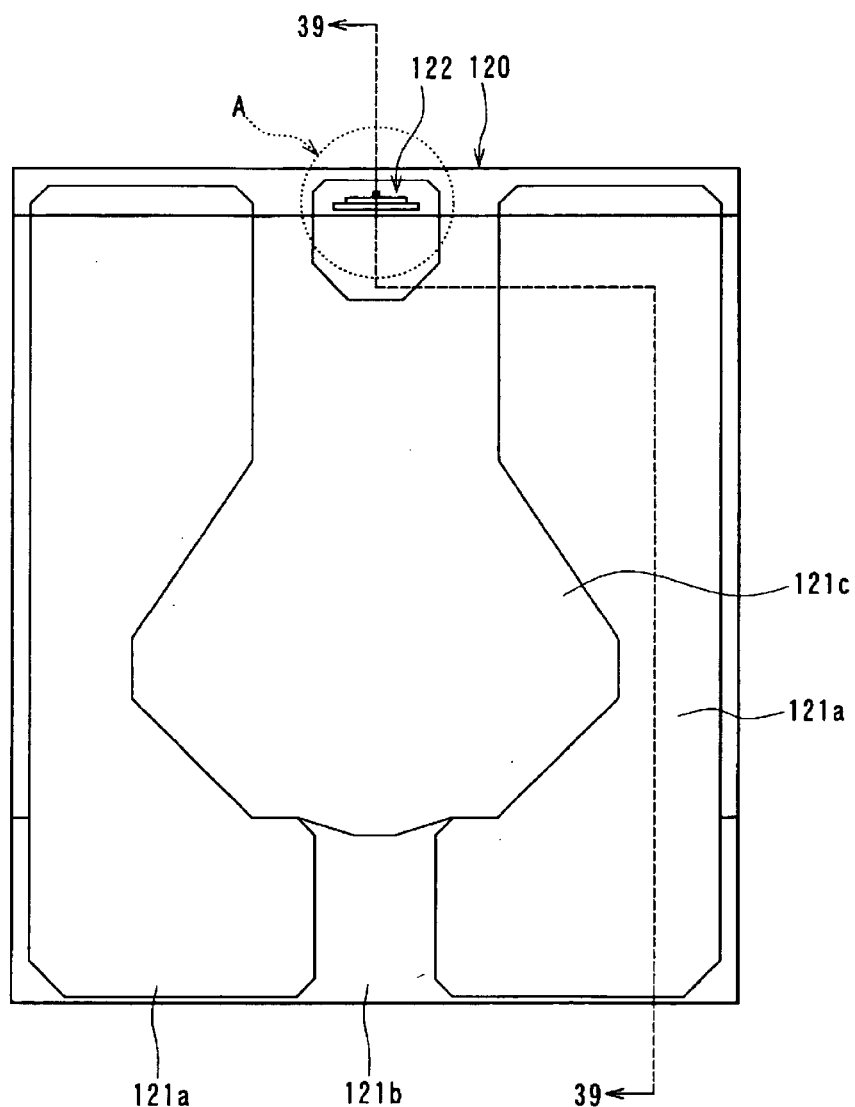
FIG. 37 is a bottom view illustrating an example of a configuration of the air bearing surface of a related-art slider.

FIG. 33 is a perspective view of the slider 20 according to a third modified example. In the slider 20 of the third modified example, the first medium facing surface 31 includes a plurality of recesses 38 formed in regions including the border portions 35. The slider 20 of the third modified example is otherwise configured the same as the slider 20 shown in FIGS. 1 and 2.

The recesses 38 are formed by etching the insulating layer forming the first and second medium facing surfaces 31 and 32 or the protection layer. The other steps in the manufacturing method for the third modified example are the same as those for the slider 20 shown in FIGS. 1 and 2.

The slider 20 of the third modified example may be one which is off the surface of the recording medium 45 during the rotation of the recording medium 45 and comes into contact with the surface of the recording medium 45 when the recording medium 45 is at rest, like the slider 20 shown in FIGS. 1 and 2. Otherwise, it may be one in which the slider section 21 is in contact with the surface of the recording medium 45 at the border portion 35 regardless of whether the recording medium 45 is rotating or at rest, like the second modified embodiment.

According to the slider 20 of the third modified example, the area of the slider section 21 contacting the surface of the recording medium 45 is smaller than in the case where no recesses 38 are provided. Frictional resistance between the slider section 21 and the surface of the recording medium 45 is thereby reduced.

The invention is not limited to the foregoing embodiment, and various modifications may be made thereto. For example, the slider of the invention shall also cover one whose medium facing surface has three surfaces of different levels as shown in FIG. 38, as long as the slider is formed by bonding a slider section and a reproducing head section to each other.

As in the foregoing, the first thin-film magnetic head according to the invention comprises the recording head section having the first medium facing surface and the recording head, and the reproducing head section having the second medium facing surface and the reproducing head. The recording head section and the reproducing head section are bonded to each other to complete the thin-film magnetic head. Thus, according to the invention, the recording head section and the reproducing head section can be fabricated separately in large lots at a time. As a result, it is possible to manufacture a large number of the thin-film magnetic heads through a small number of manufacturing steps.

According to the method of manufacturing the first thin-film magnetic head of the invention, the recording head section having the first medium facing surface and the recording head, and the reproducing head section having the second medium facing surface and the reproducing head, are fabricated separately and are bonded to each other to complete the thin-film magnetic head. Thus, according to the invention, it is possible to fabricate the recording head section and the reproducing head section in large lots separately at a time. As a result, it is possible to manufacture a large number of the thin-film magnetic heads through a small number of manufacturing steps.

The second thin-film magnetic head of the invention comprises the conductor, the induction-type electromagnetic transducer, and the body. The body has the medium facing surface and the back surface. The conductor is exposed in the back surface, and the induction-type electromagnetic transducer is stacked on the conductor. The induction-type electromagnetic transducer has the first and second pole portion layers and the gap part provided between the pole portion layers. Each of the first and second pole portion layers has a protrusion for defining a recording track width, the protrusion having an end surface exposed in the medium facing surface. The thickness of each of the first and second pole portion layers defines a throat height. According to the invention, a number of thin-film magnetic heads each including the induction-type electromagnetic transducer and the medium facing surface can be fabricated at a time. As a result, it is possible to mass-manufacture the thin-film magnetic heads through a small number of manufacturing steps.

In the method of manufacturing the second thin-film magnetic head of the invention, the conductor is first formed and the induction-type electromagnetic transducer is stacked on the conductor. The induction-type electromagnetic transducer has the first and second pole portion layers and the gap part provided between the pole portion layers. Each of the first and second pole portion layers has a protrusion for defining a recording track width, the protrusion having an end surface exposed in the medium facing surface. The thickness of each of the first and second pole portion layers defines a throat height. According to the invention, a number of thin-film magnetic heads each including the induction-type electromagnetic transducer and the medium facing surface can be fabricated at a time. As a result, it is possible to mass-manufacture the thin-film magnetic heads through a small number of manufacturing steps.

The slider for a thin-film magnetic head of the invention comprises the slider section having the first medium facing surface and the recording head, and the reproducing head section having the second medium facing surface and the reproducing head. The slider section and the reproducing head section are bonded to each other to complete the slider. Thus, according to the invention, the slider section and the reproducing head section can be fabricated separately in large lots at a time. As a result, it is possible to manufacture the slider through a small number of manufacturing steps.

In the slider for a thin-film magnetic head of the invention, the first medium facing surface may have a first surface closer to the reproducing head section, a second surface farther from the reproducing head section, and a border portion between the first surface and the second surface. The first surface and the second surface may be slanted with respect to each other such that the first and second surfaces make a convex shape bent at the border portion. In this case, when the slider section comes into contact with the surface of the recording medium, the border portion makes the contact with the surface of the recording medium. As a result, it is possible to prevent the slider from sticking to the recording medium and to prevent a damage to the recording medium and the thin-film magnetic head due to a collision between the slider and the recording medium, while attaining a reduction in magnetic space. Furthermore, since the joint between the slider section and the reproducing head section does not contact the surface of the recording medium, it is possible to prevent breakage of the slider which could be caused by an external force applied by the recording medium to the joint between the slider section and the reproducing head section.

According to the method of manufacturing the slider of the invention, the slider section having the first medium facing surface and the recording head, and the reproducing head section having the second medium facing surface and the reproducing head, are fabricated separately and are bonded to each other to complete the slider. Thus, according to the invention, it is possible to fabricate the slider section and the reproducing head section in large lots separately at a time. As a result, it is possible to manufacture the slider through a small number of manufacturing steps.

The method of manufacturing the slider of the invention may further comprise the step of lapping the first medium facing surface and the second medium facing surfaces so as to flatten the first and second medium facing surfaces, after the step of bonding the slider section and the reproducing section to each other. In this case, it is possible to flatten the first and second medium facing surfaces even if the slider section and the reproducing head section are bonded to each other with poor positioning precision.

The method of manufacturing the slider of the invention may further comprise, after the step of bonding the slider section and the reproducing head section to each other, the step of lapping the first medium facing surface so as to allow the first medium facing surface to have the first surface closer to the reproducing head section, the second surface farther from the reproducing head section, and the border portion between the first and second surfaces, and to allow the first and second surfaces to slant with respect to each other such that the first and second surfaces make a convex shape bent at the border portion. In the slider manufactured by this method, when the slider section comes into contact with the surface of the recording medium, the border portion makes the contact with the surface of the recording medium. As a result, it is possible to prevent the slider from sticking to the recording medium and to prevent damage to the recording medium and the thin-film magnetic head which could be caused by a collision between the slider and the recording medium, while attaining a reduction in magnetic space. Furthermore, since the joint between the slider section and the reproducing head section does not contact the surface of the recording medium, it is possible to prevent breakage of the slider which could be caused by an external force applied by the recording medium to the joint between the slider section and the reproducing head section.

Obviously many modifications and variations of the present invention are possible in the light of the above teachings. It is therefore to be understood that within the scope of the appended claims the invention may be practiced otherwise than as specifically described.

What is claimed is:

1. A thin-film magnetic head comprising:
   a recording head section having a recording head and a first medium facing surface that faces toward a recording medium; and
   a reproducing head section having a reproducing head and a second medium facing surface that faces toward the recording medium, wherein:
   the recording head section and the reproducing head section are bonded to each other so that the first medium facing surface and the second medium facing surface are continuous;
   the recording head section includes a recording head section body for accommodating the recording head, the recording head section body having the first medium facing surface and a back surface located on the opposite side from the first medium facing surface;
   the recording head has an induction-type electromagnetic transducer, and an insulating layer having a bottom surface exposed in the back surface and a top surface opposite to the bottom surface;
   the induction-type electromagnetic transducer has: a thin-film coil; first and second pole portion layers opposed to each other and disposed near the first medium facing surface; a magnetic-path-forming part that is disposed so as to surround a part of the thin-film coil and couples the first pole portion layer and the second pole portion layer to each other; and a gap part provided between the first and second pole portion layers;
   the thin-film coil and the magnetic-path-forming part are disposed above the top surface of the insulating layer;
   the first and second pole portion layers are disposed above the thin-film coil and exposed in the first medium facing surface; and
   the thin-film coil is located in a plane substantially parallel to the first medium facing surface.

2. A thin-film magnetic head according to claim 1, wherein:
   the recording head further has a conductor that is surrounded by the insulating layer and exposed in the back surface, and that is electrically connected to an external device and to the thin-film coil;
   each of the first and second pole portion layers has a protrusion for defining a recording track width, the protrusion having an end surface exposed in the first medium facing surface; and
   the thickness of each of the first and second pole portion layers defines a throat height.

3. A thin-film magnetic head according to claim 1, wherein:
   the reproducing head section includes a reproducing head section body for accommodating the reproducing head, the reproducing head section body having the second medium facing surface and a back surface located on the opposite side from the second medium facing surface; and
   the reproducing head has a conductor that is exposed in the back surface and electrically connected to an external device, and a magnetoresistive element that is disposed near the second medium facing surface and electrically connected to the conductor.

4. A thin-film magnetic head comprising: a conductor that is electrically connected to an external device; an insulating layer surrounding the conductor; an induction-type electromagnetic transducer electrically connected to the conductor; and a body for accommodating the conductor, the insulating layer and the induction-type electromagnetic transducer, wherein:
   the body has a medium facing surface that faces toward a recording medium, and a back surface located on the opposite side from the medium facing surface;
   the insulating layer has a bottom surface exposed in the back surface, and a top surface opposite to the bottom surface;
   the conductor is exposed in the back surface;
   the induction-type electromagnetic transducer has: a thin-film coil electrically connected to the conductor; first and second pole portion layers opposed to each other and disposed near the medium facing surface; a magnetic-path-forming part that is disposed so as to surround a part of the thin-film coil and couples the first pole portion layer and the second pole portion layer to each other; and a gap part provided between the first and second pole portion layers;
   the thin-film coil and the magnetic-path-forming part are disposed above the top surface of the insulating layer;
   the first and second pole portion layers are disposed above the thin-film coil and exposed in the medium facing surface;
   the thin-film coil is located in a plane substantially parallel to the medium facing surface;
   each of the first and second pole portion layers has a protrusion for defining a recording track width, the protrusion having an end surface exposed in the medium facing surface; and
   the thickness of each of the first and second pole portion layers defines a throat height.

5. A slider for a thin-film magnetic head comprising:
   a slider section having a recording head and a first medium facing surface that faces toward a rotating recording medium; and
   a reproducing head section having a reproducing head and a second medium facing surface that faces toward the recording medium, wherein:
   the first medium facing surface has concavities and convexities for controlling the orientation of the slider section while the recording medium is rotating, the slider section and the reproducing head section are bonded to each other so that the first medium facing surface and the second medium facing surface are continuous;

the slider section has a body for accommodating the recording head, the body having the first medium facing surface and a back surface located on the opposite side from the first medium facing surface;

the recording head has an induction-type electromagnetic transducer, and an insulating layer having a bottom surface exposed in the back surface and a top surface opposite to the bottom surface;

the induction-type electromagnetic transducer has: a thin-film coil; first and second pole portion layers opposed to each other and disposed near the first medium facing surface; a magnetic-path-forming part that is disposed so as to surround a part of the thin-film coil and couples the first pole portion layer and the second pole portion layer to each other; and a gap part provided between the first and second pole portion layers;

the thin-film coil and the magnetic-path-forming part are disposed above the top surface of the insulating layer;

the thin-film coil is located in a plane substantially parallel to the first medium facing surface; and the first and second pole portion layers are disposed above the thin-film coil and exposed in the first medium facing surface.

6. A slider for a thin-film magnetic head according to claim 5, wherein the reproducing head includes a magnetoresistive element.

7. A slider for a thin-film magnetic head comprising:

a slider section having a recording head and a first medium facing surface that faces toward a rotating recording medium; and a reproducing head section having a reproducing head and a second medium facing surface that faces toward the recording medium, wherein:

the first medium facing surface has concavities and convexities for controlling the orientation of the slider section while the recording medium is rotating;

the slider section and the reproducing head section are bonded to each other so that the first medium facing surface and the second medium facing surface are continuous; and the first medium facing surface has a first surface closer to the reproducing head section, a second surface farther from the reproducing head section, and a border portion between the first surface and the second surface, the first surface and the second surface being slanted with respect to each other such that the first and second surfaces make a convex shape bent at the border portion.

8. A slider for a thin-film magnetic head according to claim 7, wherein, while the recording medium is rotating, at least either the first surface or the second surface slants with respect to the surface of the recording medium such that the smaller the distance from a point in at least either the first or second surface to the border portion, the smaller the distance from said point to the recording medium.

9. A slider for a thin-film magnetic head according to claim 7, wherein the slider section is in contact with the surface of the recording medium while the recording medium is at rest, and is off the surface of the recording medium while the recording medium is rotating.

10. A slider for a thin-film magnetic head according to claim 9, wherein, when the slider section comes into contact with the surface of the recording medium, the border portion is the first to make contact with the surface of the recording medium.

11. A slider for a thin-film magnetic head according to claim 9, wherein, when the slider section takes off from the surface of the recording medium, the border portion is the last to depart from the surface of the recording medium.

12. A slider for a thin-film magnetic head according to claim 7, wherein, regardless of whether the recording medium is rotating or at rest, the slider section is in contact with the surface of the recording medium at the border portion, and the first surface and the second surface slant with respect to the surface of the recording medium.

13. A slider for a thin-film magnetic head according to claim 7, wherein the first medium facing surface has a recess formed in a region including the border portion.

* * * * *